(12) United States Patent
Zhu et al.

(10) Patent No.: US 9,794,538 B2
(45) Date of Patent: Oct. 17, 2017

(54) COLOR ADJUSTMENT APPARATUS, IMAGE DISPLAY APPARATUS, AND COLOR ADJUSTMENT METHOD

(71) Applicant: EIZO Corporation, Ishikawa (JP)

(72) Inventors: Lei Zhu, Kanagawa (JP); Masafumi Higashi, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 92 days.

(21) Appl. No.: 14/842,779

(22) Filed: Sep. 1, 2015

(65) Prior Publication Data

US 2015/0373314 A1 Dec. 24, 2015

Related U.S. Application Data

(63) Continuation of application No. PCT/JP2013/073090, filed on Aug. 29, 2013.

(30) Foreign Application Priority Data

Mar. 7, 2013 (JP) .................................. 2013-045889

(51) Int. Cl.
*H04N 9/64* (2006.01)
*G09G 5/02* (2006.01)
(Continued)

(52) U.S. Cl.
CPC ............... *H04N 9/646* (2013.01); *G06T 7/90* (2017.01); *G09G 5/02* (2013.01); *H04N 1/6027* (2013.01);
(Continued)

(58) Field of Classification Search
CPC ............. G09G 5/02; H04N 9/646; H04N 9/77
See application file for complete search history.

(56) References Cited

U.S. PATENT DOCUMENTS

| 4,812,902 A | 3/1989 | Fuchsberger |
| 4,819,077 A | 4/1989 | Kikuchi et al. |
| 2009/0141979 A1 | 6/2009 | Shinoda et al. |

FOREIGN PATENT DOCUMENTS

JP   2001-061160 A   3/2001

OTHER PUBLICATIONS

Extended European Search Report for European Patent Application No. 13877278.5, issued by the European Patent Office dated Sep. 7, 2016.

(Continued)

*Primary Examiner* — Antonio A Caschera

(57) ABSTRACT

Color of a color image may be adjusted by a color adjustment apparatus, image display apparatus, and color adjustment method to enable easier distinction between objects shown in the image. A parameter defines a range of saturation to be adjusted within saturation before color adjustment and a range of change of the saturation after color adjustment compared to the saturation before color adjustment. The color adjustment apparatus calculates the saturation from an image signal, calculates the saturation after color adjustment according to the saturation before color adjustment such that the saturation in the range determined by the parameter increases/decreases by an amount determined by the parameter, and generates an image signal from the saturation after color change. By determining the parameter such that the saturation difference between prescribed colors is greater after color adjustment, the difference in color between a plurality of objects shown in the image is increased.

17 Claims, 9 Drawing Sheets

(51) Int. Cl.
*H04N 1/62* (2006.01)
*H04N 9/77* (2006.01)
*H04N 1/60* (2006.01)
*G06T 7/90* (2017.01)

(52) U.S. Cl.
CPC .............. *H04N 1/62* (2013.01); *H04N 9/643* (2013.01); *H04N 9/77* (2013.01); *G09G 2320/0666* (2013.01)

(56) References Cited

OTHER PUBLICATIONS

Office Action issued for counterpart Australian Application 2013381285, issued by Australian Patent Office dated Nov. 1, 2016.
Notice of Second Office Action for Patent Application No. 201380073876.2, issued by the State Intellectual Property Office of the People's Republic of China (Chinese Patent Office) dated Aug. 9, 2017.

COLOR ADJUSTMENT APPARATUS, IMAGE DISPLAY APPARATUS, AND COLOR ADJUSTMENT METHOD

The contents of the following patent applications are incorporated herein by reference: No. 2013-045889 filed on Mar. 7, 2013 and No. PCT/JP2013/073090 filed on Aug. 29, 2013.

BACKGROUND

1. Technical Field

The present invention relates to an apparatus that displays or forms a color image, more specifically to a color adjustment apparatus that adjusts the color used in a color image, an image display apparatus that displays an image having the adjusted color, and a color adjustment method.

2. Related Art

Conventionally, an image display apparatus that displays a color image is used in a variety of fields beyond the fields of computer monitors and television receiving devices. For example, in the medical field, such image display apparatuses are used for medical diagnoses whereby the image display device displays a medical image such as an image captured inside a body by an endoscope. Furthermore, in the security field, monitoring is performed by using such image display apparatuses to display an image captured by a surveillance camera. With a conventional image display apparatus, in order to improve the color reproducibility of the color image, the color included in the displayed image is adjusted by adjusting the information indicating the color of each pixel in the image. Patent Document 1 discloses technology for adjusting the saturation or chromaticity of the color included in an image.

PRIOR ART DOCUMENTS

Patent Documents

Patent Document 1: Japanese Patent Application Publication No. 2001-61160

SUMMARY OF THE INVENTION

Problems to be Solved by the Invention

When using a color medical image, it is necessary to distinguish between internal organs and blood vessels in the image. However, it is difficult to make this distinction because the color of the internal organs is similar to the color of the blood vessels. Furthermore, when monitoring with a surveillance camera, depending on the capability of the color filter used in the surveillance camera, many colors similar to white may be included in the image, which makes it difficult to distinguish between subjects in the image. In this way, depending on how the color image is used, there is a problem that it is difficult to distinguish between objects shown in the image due to the objects having similar colors. Patent Document 1 discloses technology for adjusting the color in order to improve the color reproducibility of a color image, but there is no technology known for adjusting the color in order to distinguish between objects shown in the image.

In light of the problems described above, it is an object of the present invention to provide a color adjustment apparatus, an image display apparatus, and a color adjustment method for adjusting the color of a color image in order to enable easy distinction between objects shown in the image.

SUMMARY

According to the present invention, provided is a color adjustment apparatus that adjusts color of a color image represented by an image signal, comprising a storage section that stores a parameter for defining a range of saturation to be adjusted within saturation before color adjustment and a range of change of saturation after color adjustment compared to the saturation before color adjustment; a saturation correspondence value calculating section that calculates a first correspondence value corresponding to the saturation of each pixel forming the color image, from the image signal; a saturation adjusting section that calculates a second correspondence value corresponding to the saturation after color adjustment corresponding to the first correspondence value calculated by the saturation correspondence value calculating section, based on the parameter; and an image signal generating section that generates an image signal representing a color image in which the color has been adjusted, according to the second correspondence value calculated by the saturation adjusting section. The parameter is determined such that a difference in the saturation between a prescribed plurality of colors is greater after the color adjustment.

In the color adjustment apparatus of the present invention, the first correspondence value is the saturation before color adjustment, the second correspondence value is the saturation after color adjustment, and the parameter includes a lower limit value and an upper limit value for saturation to be adjusted within the saturation before color adjustment, a maximum setting value determining a saturation whose change amount is to be greatest within the saturation before color adjustment, and the saturation after color adjustment in a case where the saturation before color adjustment is equal to the maximum setting value. The saturation adjusting section includes a section for calculating the saturation after color adjustment such that the change amount of the saturation increases according to an increase of the saturation before color adjustment, when the saturation before color adjustment is greater than the lower limit value and less than the maximum setting value, and a section for calculating the saturation after color adjustment such that the change amount of the saturation decreases according to an increase of the saturation before color adjustment, when the saturation before color adjustment is greater than the maximum setting amount and less than the upper limit value.

The color adjustment apparatus of the present invention further comprises a section for calculating a maximum value that can be realized by the saturation of each pixel, based on the image signal, and the saturation adjusting section calculates the second correspondence value such that the saturation after color adjustment is less than or equal to the maximum value.

According to the present invention, provided is a color adjustment apparatus that adjusts color of a color image represented by an image signal, comprising a storage section that stores a parameter for defining a range of saturation to be adjusted within saturation before color adjustment and a range of change of saturation after color adjustment compared to the saturation before color adjustment; a section for acquiring a luminance value of each pixel from the image signal that includes a plurality of color signal values for expressing, in combination with a plurality of colors, the color of each pixel forming the color image; a saturation correspondence value calculating section that calculates a saturation correspondence value corresponding to the saturation of each pixel, from the image signal; a saturation adjusting section that calculates an adjustment coefficient corresponding to the saturation correspondence value calculated by the saturation correspondence value calculating section, based on the parameter; and an image signal generating section for generating an image signal expressing a color image in which the color has been adjusted by, for each of the color signal values, multiplying a value obtained by subtracting the luminance value from the color signal value before color adjustment by the adjustment coefficient calculated by the saturation adjusting section and then adding the luminance value to the result of the multiplication to calculate the color signal value after color adjustment. The parameter is determined to define a maximum value of the adjustment coefficient calculated by the saturation adjusting section to be a value that causes all of the color signal values after color adjustment to be less than or equal to a maximum value that can be realized by each signal value, and the saturation adjusting section calculates the adjustment coefficient to be a value that causes all of the color signal values after color adjustment to be less than or equal to a maximum value that can be realized by each signal value.

In the color adjustment apparatus of the present invention, the saturation correspondence value is obtained, for each pixel, by dividing a distance between a point corresponding to the color of the pixel and a point corresponding to a color obtained by increasing the saturation to the maximum without changing a hue and a distance between the point corresponding to the pixel and a point corresponding to a white color, in a color space in which the color signal values are coordinates. The saturation correspondence value calculating section includes a section for calculating the adjustment coefficient for obtaining the color signal values representing the colors obtained by increasing the saturation to the maximum without changing the hue of each pixel, using a calculation method that is the same as the calculation performed by the image signal generating section; and a section for calculating, as the saturation correspondence value, a value obtained by subtracting 1 from the adjustment coefficient calculated by the section for calculating the adjusting coefficient.

In the color adjustment apparatus of the present invention, the parameter includes a lower limit value and an upper limit value for the value calculated using the same calculation method as used for the saturation correspondence value according to the saturation to be increased within the saturation before color adjustment, a maximum setting value that determines a value obtained using the same calculation method as used for the saturation correspondence value according to the saturation to be increased to the maximum within the saturation before color adjustment, and the adjustment coefficient for a case in which the saturation correspondence value is equal to the maximum setting value, the adjustment coefficient being determined to be a value greater than 1 and less than or equal to a value obtained by adding 1 to the maximum setting value. The saturation adjusting section further includes a section for calculating the adjustment coefficient in a manner to increase according to an increase of the saturation correspondence value, when the saturation correspondence value is greater than the lower limit value and less than the maximum setting value, and a section for calculating the adjustment coefficient in a manner to decrease according to an increase of the saturation correspondence value, when the saturation correspondence value is greater than the maximum setting value and less than the upper limit value.

In the color adjustment apparatus of the present invention, the parameter includes a lower limit value and an upper limit value for the value calculated using the same calculation method as used for the saturation correspondence value according to the saturation to be increased within the saturation before color adjustment, a maximum setting value that determines a value obtained using the same calculation method as used for the saturation correspondence value according to the saturation to be increased to the maximum within the saturation before color adjustment, and a coefficient change parameter for changing the adjustment coefficient for a case in which the saturation correspondence value is equal to the maximum setting value, according to a brightness value in a range from a value greater than 1 to a value less than or equal to a value obtained by adding 1 to the maximum setting value. The saturation adjusting section further includes a section for calculating the adjustment coefficient for the case in which the saturation correspondence value is equal to the maximum setting value according to the brightness value, based on the coefficient change parameter, a section for calculating the adjustment coefficient in a manner to increase according to an increase of the saturation correspondence value, when the saturation correspondence value is greater than the lower limit value and less than the maximum setting value, and a section for calculating the adjustment coefficient in a manner to decrease according to an increase of the saturation correspondence value, when the saturation correspondence value is greater than the maximum setting value and less than the upper limit value.

In the color adjustment apparatus of the present invention, the storage section stores the parameter in association with each of a plurality of hue ranges obtained by classifying hue. The color adjustment apparatus further comprises a hue acquiring section that acquires the hue of each pixel forming the color image, from the image signal, and a parameter reading section that reads the parameter associated with the hue acquired by the hue acquiring section from among parameters stored in the storage section. The saturation adjusting section performs calculation based on the parameter read by the parameter reading section.

According to the present invention, provided is an image display apparatus comprising the color adjustment apparatus of the present invention and a section for displaying the color image whose color has been adjusted by the color adjustment apparatus.

According to the present invention, provided is a color adjustment method for adjusting color of a color image represented by an image signal, comprising determining a parameter for defining a range of saturation to be adjusted within saturation before color adjustment and a range of change of saturation after color adjustment compared to the saturation before color adjustment; saturation correspondence value calculation of calculating a first correspondence value corresponding to the saturation of each pixel forming the color image, from the image signal; saturation adjustment of calculating a second correspondence value corresponding to the saturation after color adjustment corresponding to the first correspondence value calculated in the saturation correspondence value calculation, based on the parameter; and generating an image signal representing a color image in which the color has been adjusted, according to the second correspondence value calculated in the saturation adjustment. The parameter is determined such that a difference in the saturation between a prescribed plurality of colors is greater after the color adjustment.

In the color adjustment method of the present invention, the first correspondence value is the saturation before color adjustment, the second correspondence value is the saturation after color adjustment, and the parameter includes a lower limit value and an upper limit value for saturation to be adjusted within the saturation before color adjustment, a maximum setting value determining a saturation whose change amount is to be greatest within the saturation before color adjustment, and the saturation after color adjustment in a case where the saturation before color adjustment is equal to the maximum setting value. The saturation adjustment includes calculating the saturation after color adjustment such that the change amount of the saturation increases according to an increase of the saturation before color adjustment, when the saturation before color adjustment is greater than the lower limit value and less than the maximum setting value, and calculating the saturation after color adjustment such that the change amount of the saturation decreases according to an increase of the saturation before color adjustment, when the saturation before color adjustment is greater than the maximum setting amount and less than the upper limit value.

According to the present invention, provided is a color adjustment method for adjusting color in a manner to increase saturation of a color image represented by an image signal, comprising determining a parameter for defining a range of saturation to be adjusted within saturation before color adjustment and a range of change of saturation after color adjustment compared to the saturation before color adjustment; acquiring a luminance value of each pixel from the image signal that includes a plurality of color signal values for expressing, in combination with a plurality of colors, the color of each pixel forming the color image; saturation correspondence value calculation of calculating a saturation correspondence value corresponding to the saturation of each pixel, from the image signal; saturation adjustment of calculating an adjustment coefficient corresponding to the saturation correspondence value calculated in the saturation correspondence value calculation, based on the parameter; and image signal generation of generating an image signal expressing a color image in which the color has been adjusted, by, for each of the color signal values, multiplying a value obtained by subtracting the luminance value from the color signal value before color adjustment by the adjustment coefficient calculated in the saturation adjustment and then adding the luminance value to the result of the multiplication to calculate the color signal value after color adjustment. The parameter is determined to define a maximum value of the adjustment coefficient calculated in the saturation adjustment to be a value that causes all of the color signal values after color adjustment to be less than or equal to a maximum value that can be realized by each signal value, and the saturation adjustment includes calculating the adjustment coefficient to be a value that causes all of the color signal values after color adjustment to be less than or equal to a maximum value that can be realized by each signal value.

In the color adjustment method of the present invention, the saturation correspondence value is obtained, for each pixel, by dividing a distance between a point corresponding to the color of the pixel and a point corresponding to a color obtained by increasing the saturation to the maximum without changing a hue and a distance between the point corresponding to the pixel and a point corresponding to a white color, in a color space in which the color signal values are coordinates. The saturation correspondence value calculation includes calculating the adjustment coefficient for obtaining the color signal values representing the colors obtained by increasing the saturation to the maximum without changing the hue of each pixel, using a calculation method that is the same as the calculation performed in the image signal generation, and calculating, as the saturation correspondence value, a value obtained by subtracting 1 from the calculated adjustment coefficient.

In the color adjustment method of the present invention, the parameter is determined in association with each of a plurality of hue ranges obtained by classifying hue. The color adjustment method further comprises acquiring the hue of each pixel forming the color image, from the image signal, and reading the parameter associated with the acquired hue from among a plurality of the parameters. The saturation adjustment includes performing calculation based on the read parameter.

In the present invention, the color adjustment apparatus determines the parameter in association with each of a plurality of hue ranges obtained by classifying hue, and generates the image signal whose color is adjusted based on the parameter. By determining the parameter such that the difference in saturation between a prescribed plurality of colors is increased, it is possible to adjust the saturation such that the difference in color between a plurality of objects shown in the image is increased.

In the present invention, the parameter includes a maximum setting value determining the saturation whose change amount is to be greatest within the saturation before color adjustment, and a saturation after color adjustment for a case where the saturation before color adjustment is the maximum setting value. The color adjustment apparatus increases the change amount of the saturation according to an increase of the saturation for a saturation that is less than the maximum setting value, within the saturation that is to be adjusted, and decreases the change amount of the saturation according to an increase of the saturation for a saturation that is greater than the maximum setting value. In this way, the color adjustment apparatus adjusts the saturation.

In the present invention, the color adjustment apparatus adjusts the color such that the saturation after color adjustment is less than or equal to the maximum value that can be realized by the saturation. In this way, color shift is unlikely to occur in the image.

In the present invention, the color adjustment apparatus calculates the color signal value after color change by multiplying a value obtained by subtracting the luminance value from the color signal value before color adjustment by the adjustment coefficient and then adding the luminance value to the result of the multiplication, and adjusts the color by determining the adjustment coefficient according to the saturation correspondence value corresponding to the saturation before color adjustment. The saturation is increased when the adjustment coefficient is greater than 1. It is possible to perform color adjustment corresponding to the saturation without performing a color space conversion, and it is possible to increase the saturation without changing the luminance or hue of the pixels.

In the present invention, the color adjustment apparatus calculates the saturation correspondence value to be a value obtained by dividing a distance between a point corresponding to the color of the pixel and a point corresponding to a color obtained by increasing the saturation to the maximum without changing a hue and a distance between the point corresponding to the pixel and a point corresponding to a white color, in a color space in which the color signal values are coordinates, and calculates the adjustment coefficient according to the calculated saturation correspondence value. The saturation correspondence value can be easily calculated, and it is possible to perform the color adjustment using a simple calculation.

In the present invention, the maximum value of the adjustment coefficient is determined to be less than or equal to a value obtained by adding 1 to a corresponding prescribed saturation correspondence value, such that the color signal value after color adjustment does not exceed the maximum value that can be realized by this color signal value. The color adjustment apparatus calculates the adjustment coefficient according to the saturation correspondence value, in a range where the color signal value after color adjustment does not exceed the maximum value that can be realized by this color signal value. In this way, the saturation can be increased within a range that does not exceed the maximum saturation that can be displayed by the image display apparatus.

In the present invention, the color adjustment apparatus calculates the maximum value of the adjustment coefficient to be a value that corresponds to the luminance value and that is less than or equal to a value obtained by adding 1 to a corresponding prescribed saturation correspondence value. In this way, the color adjustment apparatus can adjust the adjustment coefficient according to the luminance value and adjust the saturation to be a value dependent on the luminance value.

In the present invention, the color adjustment apparatus classifies the hue into a plurality of hue ranges and determines a parameter for each of the hue ranges. Therefore, by classifying the hue ranges such that each of a prescribed plurality of colors is in a different hue range, it is possible to have a different change amount in the saturation for each hue range and increase the difference in color between a plurality of objects shown in the image.

Effect of the Invention

With the present invention, it is possible to change the color saturation of an image such that the color difference between a plurality of objects shown in the image is increased, and therefore a user can more easily distinguish the plurality of objects shown in the image from each other.

DESCRIPTION OF EXEMPLARY EMBODIMENTS

Hereinafter, some embodiments of the present invention will be described in detail with reference to the drawings.

First Embodiment

Figure 1:
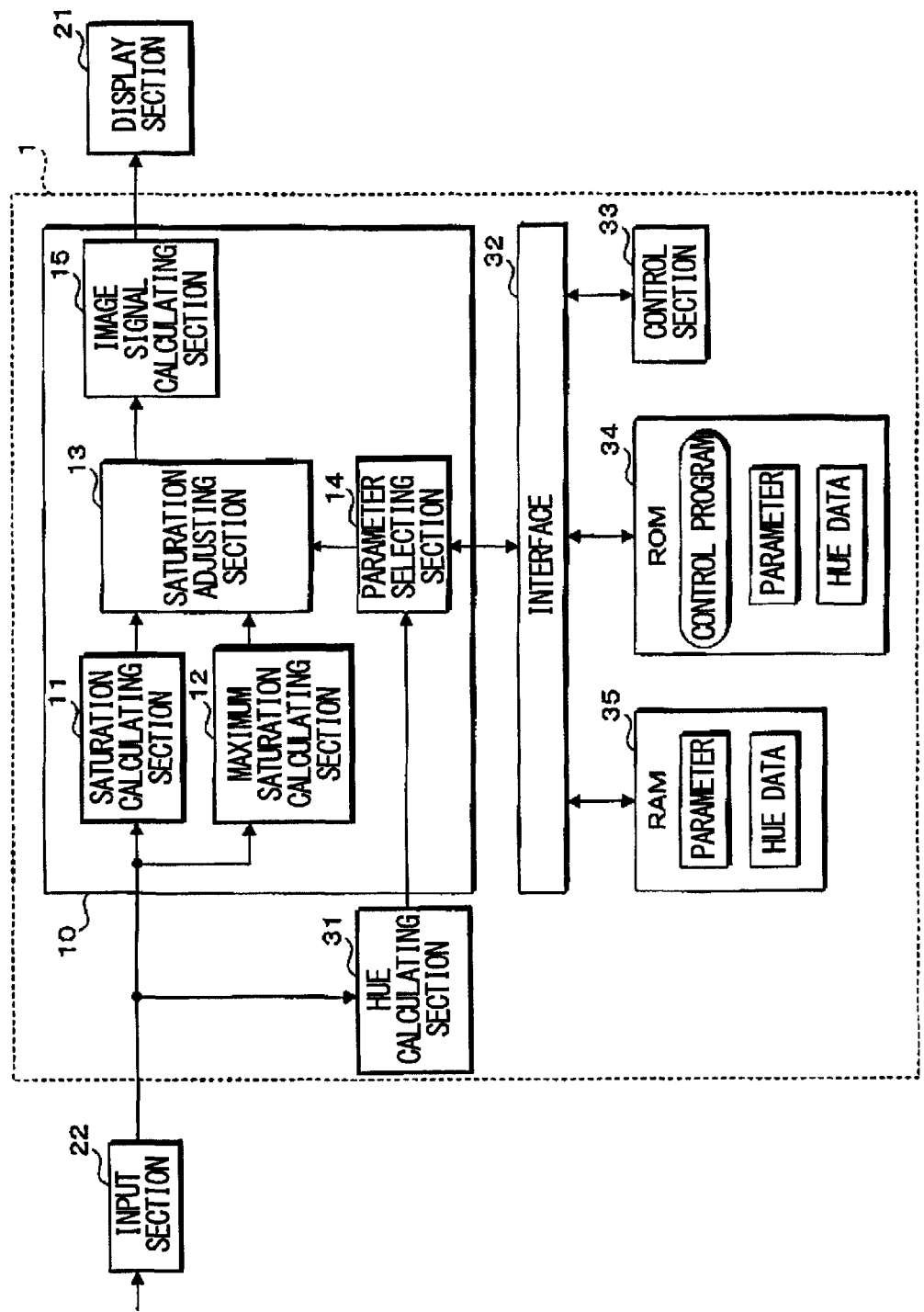
FIG. 1 is a block diagram showing a functional configuration inside an image display apparatus according to a first embodiment of the present invention.

FIG. 1 is a block diagram showing a functional configuration inside an image display apparatus according to a first embodiment of the present invention. The image display apparatus according to the present invention displays a color image. The image display apparatus includes a display section 21 that displays the image using an image display device such as a liquid crystal panel or an EL (Electro Luminescence) panel, an input section 22 into which is input an image signal representing an image, and a color adjustment circuit 10 that adjusts the saturation of the color included in the image. The input section 22 is an interface into which is input, from the outside, an image signal that includes R (red), G (green), and B (blue) color signals expressing the color of each of the pixels included in the image. For example, the image display apparatus is a computer monitor, and the image signal is input to the input section 22 from the main body of the computer. The image display apparatus may be an apparatus that displays at least one of a still image and a moving image, or may be an apparatus that displays both types of images. The image display apparatus may have a function to generate an image signal and may input the generated image into the input section 22, in the manner of a television receiving device that displays an image based on a broadcast signal received by an antenna, for example.

The color adjustment circuit 10 is connected between the input section 22 and the display section 21. The color adjustment circuit 10 receives the image signal from the input section 22, performs a process to adjust the image signal in a manner to adjust the color of each pixel included in the image represented by the image signal, and outputs an adjusted image signal. The display section 21 receives the image signal output by the color adjustment circuit 10 and displays an image based on the received image signal. The image display apparatus includes a hue calculating section 31 that calculates the hue of the color of each pixel from the image signal. The hue calculating section 31 corresponds to a hue acquiring section. The hue calculating section 31 is connected to the input section 22 and the color adjustment circuit 10. The hue calculating section 31 calculates the hue using a prescribed calculation method, from the RGB color signal values included in the image signal, for example. A known calculation method may be used for the hue calculation method. The hue calculating section 31 inputs the calculated hue to the color adjustment circuit 10.

The color adjustment circuit 10 is connected to an interface 32 for converting data for other devices within the image display apparatus. The interface 32 is connected to a control section 33 that controls the operation of the image display apparatus, a non-volatile ROM (Read Only Memory) 34, and a RAM (Random Access Memory) 35. The ROM 34 and the RAM 35 correspond to a storage section. The control section 33 is formed by a microcontroller, for example. The ROM 34 stores a control program, and the control section 33 executes processes based on the control program stored in the ROM 34. The ROM 34 stores in advance parameters used for the color adjustment. The control section 33 reads the parameters stored in the ROM 34 and performs a process to store the read parameters in the RAM 35. The color adjustment circuit 10, the hue calculating section 31, the interface 32, the control section 33, the ROM 34, and the RAM 35 form the color adjustment apparatus 1 according to the present embodiment.

The color adjustment circuit 10 includes a saturation calculating section 11 that calculates the color saturation of each pixel included in the image from the image signal, and a maximum saturation calculating section 12 that calculates a maximum color saturation that can be displayed by the display section 21. The saturation calculating section 11 corresponds to a saturation correspondence value calculating section. The saturation calculating section 11 and the maximum saturation calculating section 12 are connected to the input section 22, and receive the image signal from the input section 22. The saturation calculating section 11 calculates the saturation using a prescribe calculation method, from the RGB color signal values included in the image signal, for example. A known calculation method is used for the saturation calculation method. The maximum saturation calculating section 12 calculates the maximum saturation using a prescribe calculation method. For example, the maximum saturation calculating section 12 changes the RGB color signal values and calculates the values at which the saturation is at the maximum.

The color adjustment circuit 10 includes a parameter selecting section 14 that performs a process to select the parameter necessary for the color adjustment according to the hue, and the parameter selecting section 14 is connected to the hue calculating section 31. The parameter selecting section 14 corresponds to a parameter reading section. The saturation calculating section 11, the maximum saturation calculating section 12, and the parameter selecting section 14 are connected to a saturation adjusting section 13 that adjusts the saturation using the maximum saturation and the parameter. The saturation adjusting section 13 is connected to an image signal calculating section 15 that calculates the image signal corresponding to the adjusted saturation. The image signal calculating section 15 corresponds to an image signal generating section. For example, the image signal calculating section 15 calculates the image signal by performing a calculation that is the inverse of the calculation method performed by the saturation calculating section 11. The image expressed by the image signal calculated by the image signal calculating section 15 is an image in which the saturation has been adjusted. The image signal calculating section 15 is connected to the display section 21, and inputs the calculated image signal to the display section 21.

Figure 2:
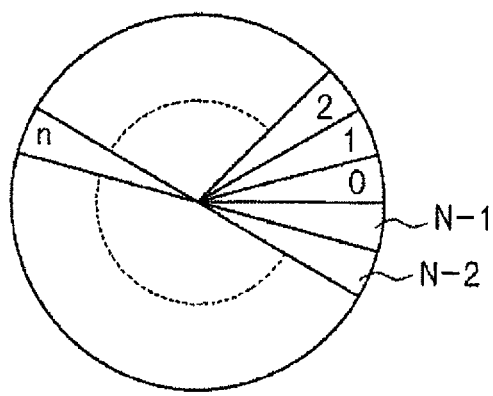
FIG. 2 is a view for describing the plurality of hue ranges.

The following describes the parameters used in the present embodiment. In the present embodiment, the hue is classified in advance into a plurality of hue ranges. FIG. 2 is a view for describing the plurality of hue ranges. FIG. 2 shows a color wheel in which the colors with different hues are arranged sequentially in the circumferential direction. In the drawing, N is a natural number, and the color wheel is divided into N hue ranges from 0 to N−1. Here, n is a natural number that is less than N−1. All hues are included among the N hue ranges.

Figure 3:
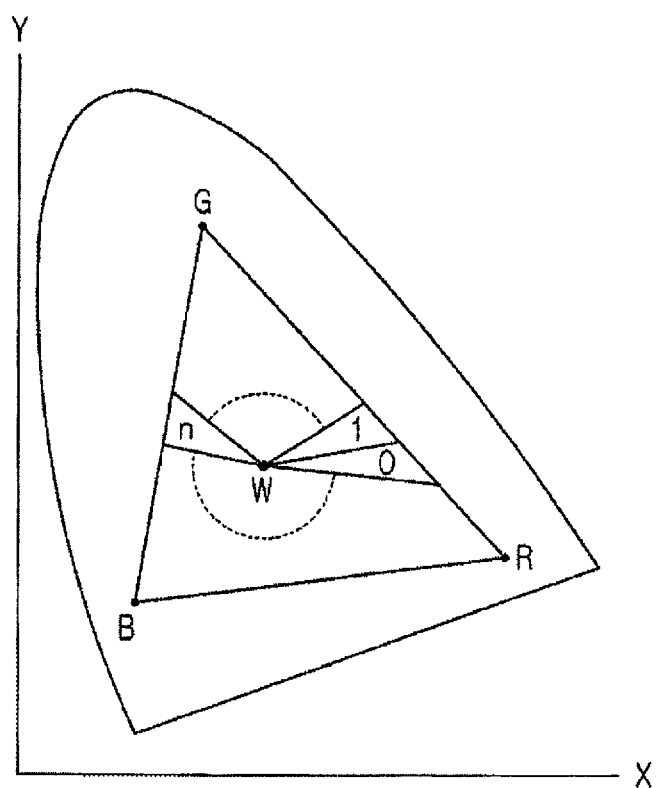
FIG. 3 is a view for describing the plurality of hue ranges in a chromaticity diagram.

FIG. 3 is a view for describing the plurality of hue ranges in a chromaticity diagram. FIG. 3 shows an XY chromaticity diagram, in which G indicates a position in the chromaticity diagram of a color occurring when the value of G included in the image signal used by the image display apparatus is at a maximum value and the values of B and R are zero. In the same manner, B in FIG. 3 indicates a position of a color occurring when the value of B included in the image signal used by the image display apparatus is at a maximum value, and R in FIG. 3 indicates a position of a color occurring when the value of R included in the image signal used by the image display apparatus is at a maximum value. The color within the range of the triangle formed by connecting the three points R, G, and B in FIG. 3 represents the color that can be displayed by the image display apparatus. Furthermore, the position of the while color in FIG. 3 is indicated by W. The N hue ranges are arranged in a manner to divide the chromaticity diagram in the circumferential direction with the point W as the center.

In the present embodiment, the N hue ranges resulting from the division are defined in advance, and hue data representing each hue range is stored in the ROM 34. For example, the hue data includes data in which a range of hue values is associated with one number from 0 to N−1. The N hue ranges are defined in advance according to experience, such that the colors of a plurality of objects which must be distinguished from each other among the objects shown in the image are each included in a different hue range. For example, the N hue ranges are determined such that the hue of the color of an internal organ shown in a color medical image is in the number 0 hue range and the hue of the color of a blood vessel is included in the number 1 hue range.

Figure 4:
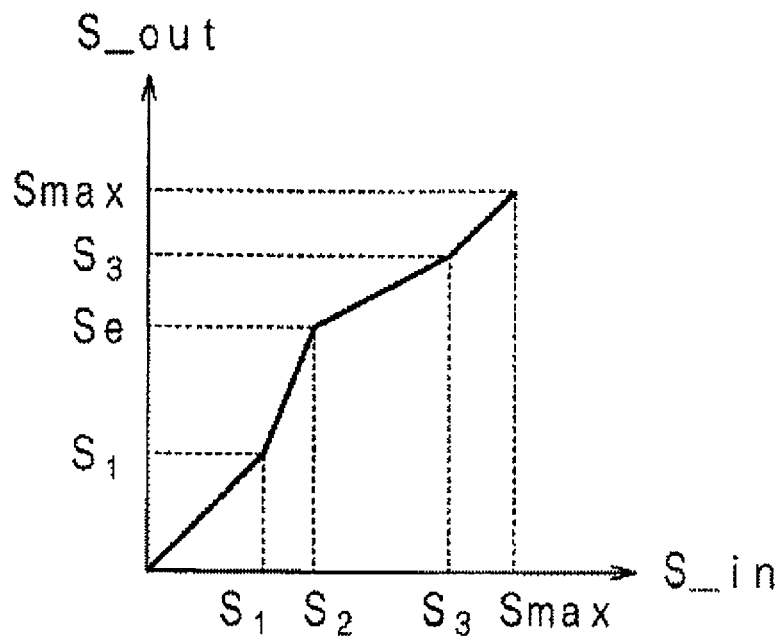
FIG. 4 is a characteristic diagram showing an example of a relationship between the saturation before the adjustment by the saturation adjusting section and the saturation after this adjustment.

For each of the N hue ranges, a parameter to be used for the color adjustment is determined in advance. The parameters include a saturation lower limit value S1 to be a target of the adjustment within the saturation before the adjustment, a saturation S2 that indicates the maximum change amount, a saturation upper limit value S3 to be a target of the adjustment within the saturation before the adjustment, and a saturation Se realized after the saturation S2 is changed. The saturation S2 corresponds to a maximum setting value. FIG. 4 is a characteristic diagram showing an example of a relationship between the saturation before the adjustment by the saturation adjusting section 13 and the saturation after this adjustment. In the drawing, the horizontal axis indicates the saturation of color expressed by the image signal input to the color adjustment apparatus 1, i.e. the saturation S_in before the adjustment. The vertical axis indicates the saturation of color expressed by the image signal output from the color adjustment apparatus 1, i.e. the saturation S_out after the adjustment. The magnitude relationship of the saturation is such that S1<S2<S3 and S2≤Se≤S3. Furthermore, Smax is the maximum value of the color saturation that can be displayed by the image display apparatus, and S1 S2, Se, and S3 are all preferably less than or equal to Smax.

As shown in FIG. 4, when the saturation is less than or equal to S1 or when the saturation is greater than or equal to S3 and less than or equal to Smax, S_out is equal to S_in. The saturation adjusting section 13 performs a process to increase any saturation that exceeds S1 and is less than S3, based on the parameters including S1, S2, Se, and S3.

Specifically, the saturation adjusting section 13 performs a process to increase S2 to be Se, among the saturations S1 to S3. Furthermore, the saturation adjusting section 13 increases S_in in the range from S1 to S2 such that the saturation increase amount increases according to the increase of S_in. The saturation adjusting section 13 increases S_in in the range from S2 to S3, such that the saturation increase amount decreases according to the increase of S_in. Referencing FIG. 4, S_in in the range from S1 to S2 is increased such that the relationship between S_out and S_in is a relationship following the straight line formed by connecting (S1, S1) and (S2, Se), and S_in in the range from S2 to S3 is increased such that the relationship between S_out and S_in is a relationship following the straight line formed by connecting (S2, Se) and (S3, S3).

Figure 5:
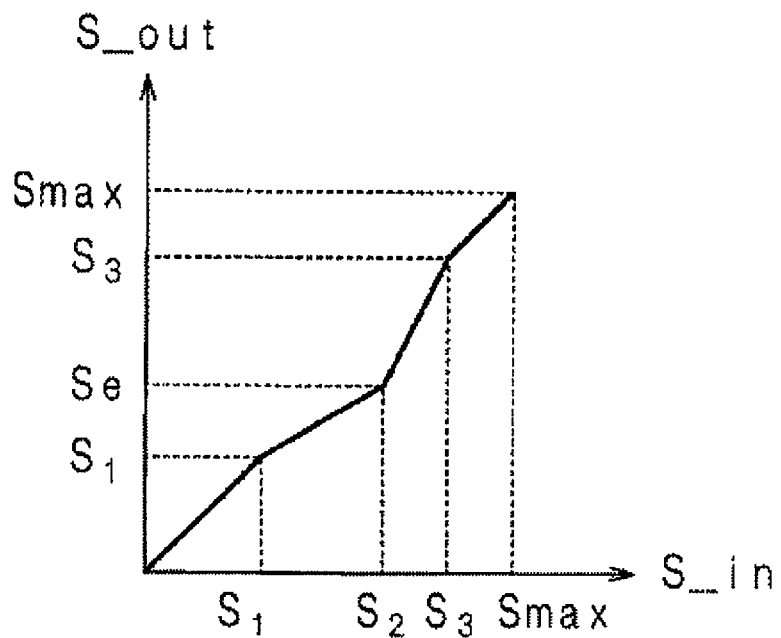
FIG. 5 is a characteristic diagram showing another example of the relationship between the saturation before the adjustment and the saturation after the adjustment.

The parameter can also be determined such that the saturation is decreased. FIG. 5 is a characteristic diagram showing another example of the relationship between the saturation before the adjustment and the saturation after the adjustment. In the example of FIG. 5, Se<S2. The saturation adjusting section 13 performs a process to decrease the saturation that is greater than S1 and less than S3, based on the parameters including S1, S2, Se, and S3. Specifically, the saturation adjusting section 13 performs a process to decrease S2 to be Se, among the saturations from S1 to S3. Furthermore, the saturation adjusting section 13 decreases S_in in the range from S1 to S2 such that the saturation decrease amount increases according to the increase of S_in. The saturation adjusting section 13 decreases S_in in the range from S2 to S3, such that the saturation decrease amount decreases according to the increase of S_in. Referencing FIG. 5, S_in in the range from S1 to S2 is decreased such that the relationship between S_out and S_in is a relationship following the straight line formed by connecting (S1, S1) and (S2, Se), and S_in in the range from S2 to S3 is decreased such that the relationship between S_out and S_in is a relationship following the straight line formed by connecting (S2, Se) and (S3, S3).

As shown in FIGS. 4 and 5, if S1, S2, and S3 are determined, the change amount of an arbitrary saturation is determined and a value of the adjusted saturation is obtained. It is also possible that Se=S2, and in this case the saturation is not changed. The parameters including S1, S2, Se, and S3 are determined for each of the N hue ranges, and stored in advance in the ROM 34. For example, a relationship between the N hue ranges from number 0 to number N−1 and the saturations S1, S2, Se, and S3 is stored. The saturations S1, S2, Se, and S3 for each hue range are determined in advance through experience, such that the difference between saturations of a prescribed plurality of colors is increased by the color adjustment. The prescribed plurality of colors correspond to the colors of a prescribed plurality of objects that must be distinguished from each other among the object shown in the image. In particular, the prescribed plurality of colors are colors that are similar to each other and that correspond to the colors of a prescribed plurality of objects that must be distinguished from each other. For example, the parameter is determined for the number 1 hue range in a manner to increase the saturation, and the parameter is determined for the number 0 hue range in a manner to decrease the saturation. By using these parameters, the difference in saturation between a prescribed color included in the number 1 hue range and a prescribed color included in the number 0 hue range is increased.

Figure 6:
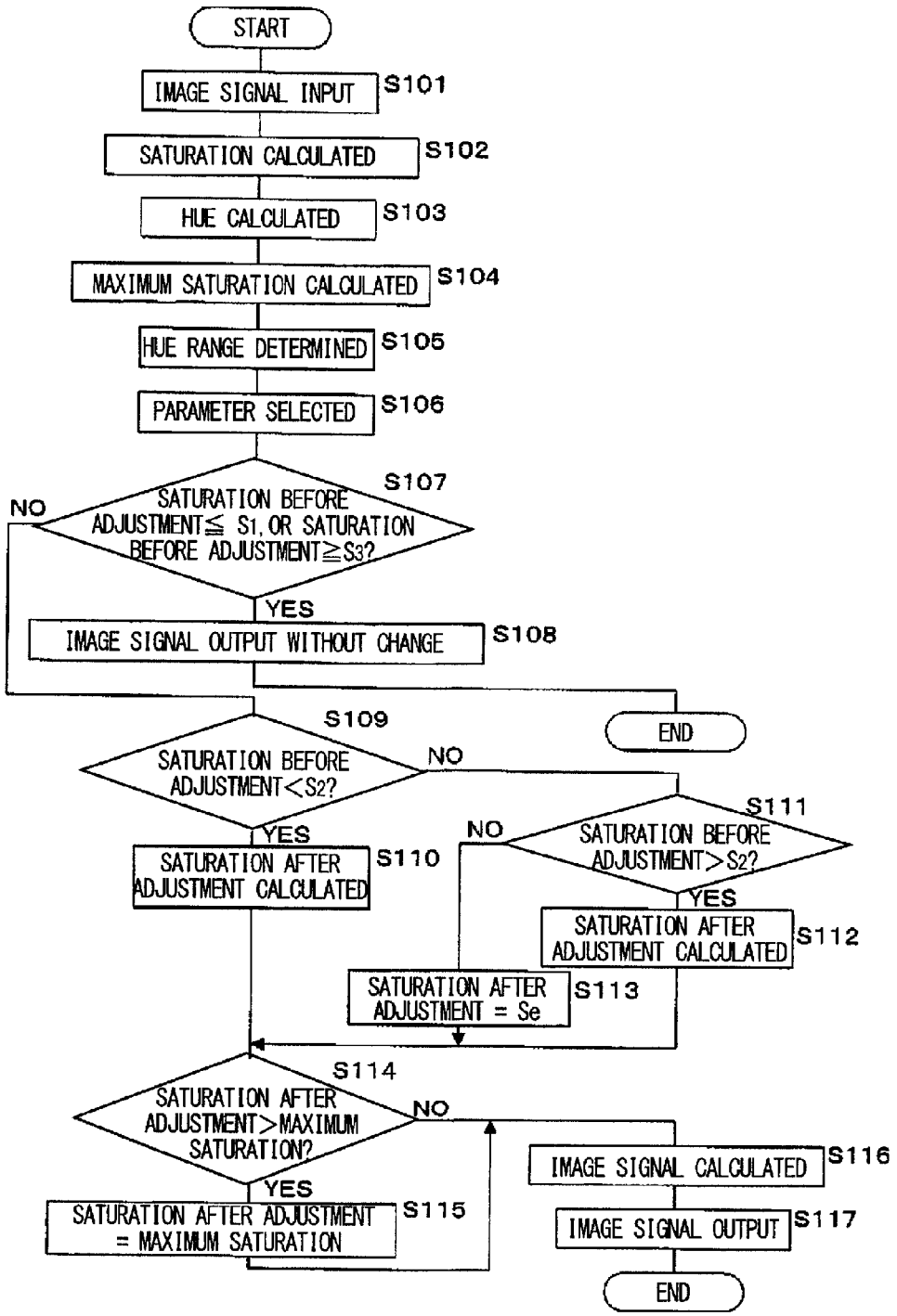
FIG. 6 is a flow chart showing the steps of the process executed by the color adjustment apparatus according to the first embodiment.

The following describes the steps of the color adjustment method. At a prescribed timing, such as when the image processing apparatus is activated, the control section 33 reads the parameters and the hue data from the ROM 34 and stores this information in the RAM 35. FIG. 6 is a flow chart showing the steps of the process executed by the color adjustment apparatus 1 according to the first embodiment. The image signal corresponding to one pixel is input from the input section 22 to the color adjustment circuit 10 and the hue calculating section 31 (S101), the saturation calculating section 11 calculates the saturation from the image signal using a prescribed calculation method (S102), the hue calculating section 31 calculates the hue from the image signal (S103), and the maximum saturation calculating section 12 calculates the maximum saturation (S104). The processes of S101, S102, S103, and S104 may be executed in a different order, or may be executed in parallel.

The parameter selecting section 14 determines the hue range that includes the hue value calculated by the hue calculating section 31 (step S105). At step S105, the parameter selecting section 14 references the hue data stored in the RAM 35, compares the calculated hue value to the N hue ranges included in the hue data, and determines the hue range that includes the hue value from among the N hue ranges. The parameter selecting section 14 selects the parameter for adjusting the saturation, according to the determined hue range (S106). At step S106, the parameter selecting section 14 reads from the RAM 35 the parameter associated with the determined hue range from among the parameters stored in the RAM 35 in association with the N hue ranges. For example, the parameter selecting section 14 reads from the RAM 35 the saturations S1, S2, Se, and S3 associated with the number of the determined hue range. The parameter selecting section 14 inputs this parameter into the saturation adjusting section 13.

The saturation adjusting section 13 references the parameter read by the parameter selecting section 14, and determines whether the saturation before the adjustment calculated by the saturation calculating section 11 is less than or equal to S1 included in the parameter and whether this saturation is greater than or equal to S3 (step S107). If the saturation before the adjustment is less than or equal to S1 or greater than or equal to S3 (S107: YES), the saturation adjusting section 13 inputs to the image signal calculating section 15 a signal indicating that the saturation is not to be changed and the image signal calculating section 15 outputs the image signal that was input to the color adjustment circuit 10 from the input section 22 to the display section 21 without changing this image signal (S108).

If the saturation before the adjustment exceeds S1 and is less than S3 (S107: NO), the saturation adjusting section 13 determines whether the saturation before the adjustment is less than S2 included in the parameter (S109). If the saturation before the adjustment is less than S2 (S109: YES), the saturation adjusting section 13 calculates the saturation after the adjustment based on S1, S2, and Se included in the parameter (S110). Specifically, as shown in FIG. 4 or 5, the saturation adjusting section 13 calculates the saturation S_out after the adjustment corresponding to the saturation S_in before the adjustment in accordance with a correspondence relationship between the saturation S_out after the adjustment and the saturation S_in before the adjustment whereby the change amount of the saturation increases according to the increase of the saturation S_in before the adjustment until S_out=Se when S_in=S2. At step S109, if the saturation before the adjustment is greater than or equal to S2 (S109: NO), the saturation adjusting section 13 determines whether the saturation before the adjustment is greater than S2 (S111). If the saturation before the adjustment is greater than S2 (S111: YES), the saturation adjusting section 13 calculates the saturation after the adjustment based on S2, Se, and S3 included in the parameter (S112). Specifically, as shown in FIG. 4 or 5, the saturation adjusting section 13 calculates the saturation S_out after the adjustment corresponding to the saturation S_in before the adjustment in accordance with a correspondence relationship between the saturation S_out after the adjustment and the saturation S_in before the adjustment whereby the change amount of the saturation decreases according to the increase of the saturation S_in before the adjustment until S_out=Se when S_in=S2. At step S111, if the saturation before the adjustment is S2 (S111: NO), the saturation adjusting section 13 determines the saturation after the adjustment to be Se (S113).

After step S110, S112, or S113 has been completed, the saturation adjusting section 13 determines whether the calculated saturation after the adjustment exceeds the maximum saturation calculated by the maximum saturation calculating section 12 (S114). If the saturation after the adjustment exceeds the maximum saturation (S114: YES), the saturation adjusting section 13 determines the saturation after the adjustment to be the maximum saturation (S115). If the saturation after the adjustment is less than or equal to the maximum saturation (S114: NO) or if step S115 has been completed, the saturation adjusting section 13 inputs the adjusted saturation into the image signal calculating section 15. The image signal calculating section 15 calculates the image signal corresponding to the saturation input from the saturation adjusting section 13 (S116) and outputs the calculated image signal to the display section 21 (S117). The color adjustment apparatus 1 receives from the input section 22 the image signals relating to all of the pixels included in the image, and executes the processes of steps S101 to S117 for all of the pixels. The display section 21 displays the image in which the color has been adjusted by displaying the image based on the image signal from the color adjustment circuit 10. In a case where the image is a moving image, the color adjustment apparatus 1 executes the process for each frame or each field, and the display section 21 displays the image in which the color has been adjusted.

The color adjustment apparatus 1 may perform the process to calculate the image signal even if the saturation before the adjustment is less than or equal to S1 or greater than or equal to S3. In this case, instead of performing step S108, the saturation adjusting section 13 performs a process to determine the saturation after the adjustment to be a value equal to that of the saturation before the adjustment, and the processing then proceeds to step S114.

As described in detail above, the color adjustment apparatus 1 classifies the hue into a plurality of hue ranges and determines the parameter that defines the range of the change of saturation and the range of the saturations to be adjusted for each hue range in advance, and adjusts the saturation of the color included in the image based on these parameters. Since the parameters are determined individually for the hue ranges, it is possible to have different ranges of saturation and different amounts of increase and decrease for each hue range. Furthermore, the parameters are determined in advance such that the difference in saturation between a prescribed plurality of colors is greater after the color adjustment.

For example, Se>S2 is set and the saturation is increased in the number 1 hue range, and Se<S2 is set and the saturation is decreased in the number 0 hue range. In a case where the hue of the color of an internal organ shown in a color medical image is included in the number 0 hue range and the hue of the color of a blood vessel is included in the number 1 hue range, the saturation of the color of the internal organ is decreased while the saturation of the color of the blood vessel is increased. Even through the color of the internal organ whose hue is included in the number 0 hue range and the color of the blood vessel whose hue is included in the number 1 hue range are similar, the saturation of one of these colors is decreased while the saturation of the other color is increased, and therefore the difference between the saturation of these colors increases. For example, the distance between the colors in the chromaticity diagram becomes greater. Therefore, the color difference between the internal organ and the blood vessel shown in the image becomes greater, and it becomes easier to distinguish the internal organ from the blood vessel in the image when compared to the conventional technology.

In the same manner, in an image captured by a surveillance camera, by adjusting the saturation such that the difference in color between a plurality of objects shown in the image becomes greater, it becomes easier to distinguish the subjects in the image from each other when compared to the conventional technology. In the present invention, the plurality of hue ranges and the parameter for each hue range should be suitably determined through experience, such that the colors representative of the plurality of objects that must be distinguished from each other among the objects shown in the image are each in a different hue range and such that the changes in saturation between the hue ranges are different. In this way, in the present embodiment, by determining the parameters such that the difference in saturation of a prescribed plurality of colors is greater after the color adjustment, it is possible to adjust the color such that the difference between similar colors becomes larger, thereby making it easier to distinguish between objects shown in the image displayed by the image display apparatus when compared to the conventional technology.

The present invention can be used even in a case where the hues of the prescribed plurality of colors are included in the same hue range. In such a case, the parameters including S1, S2, Se, and S3 should be determined such that the difference in the saturation between the prescribed plurality of colors is greater after the color adjustment. For example, if the hues of the color of an internal organ and the color of a blood vessel are included in the number 0 hue range, the parameters are set such that the saturation of a representative color of the internal organ is less than or equal to S1, the saturation of a representative color of the blood vessel is S2, and Se>S2. In this way, the saturation of the color of the blood vessel is significantly increased without significantly changing the saturation of the color of the internal organ in an image, and therefore the color difference between the internal organ and the blood vessel increases and it becomes easier to distinguish between the internal organ and the blood vessel.

The color adjustment apparatus 1 may be configured to not classify the hue into a plurality of hue ranges. With this configuration, the color saturation is adjusted based on the same parameter regardless of the hue. With this configuration, the color adjustment apparatus 1 does not include the hue calculating section 31, while the ROM 34 and the RAM 35 do not store hue data but instead store one type of parameter. Furthermore, with this configuration, the color adjustment apparatus 1 does not execute the processes of steps S103 and S105, executes a process to calculate the maximum saturation without using the calculation results of the hue calculating section 31 at step S104, and executes a process to read the one type of parameter at step S106. With this configuration as well, it is possible to determine the parameter such that the difference in saturation between a prescribed plurality of colors is greater after the color adjustment. Therefore, with this configuration as well, it is possible to change the saturation such that the difference in color between a plurality of objects shown in an image becomes greater, thereby making it easier to distinguish among a plurality of objects shown in an image when compared to the conventional technology.

The color adjustment apparatus 1 may be configured to adjust the saturation without using the maximum saturation. With this configuration, the color adjustment apparatus 1 does not include the maximum saturation calculating section 12 and does not execute the process of step S104. The saturation that has been adjusted by the saturation adjusting section 13 might exceed the maximum saturation. When the image is displayed by the display section 21, a color whose saturation exceeds the maximum saturation is oversaturated and is displayed as a color having the maximum saturation. With this configuration as well, it is possible to change the saturation such that the difference in color between a plurality of objects shown in an image becomes greater, thereby making it easier to distinguish among a plurality of objects shown in an image when compared to the conventional technology.

The color adjustment apparatus 1 may be configured to receive an image signal other than an image signal including the RGB color signal values, such as an image signal in which the pixel color is represented by a luminance signal and a color difference signal. In particular, the color adjustment apparatus 1 may be configured to receive an image signal that includes a signal indicating the hue and a signal indicating the saturation. With this configuration, the saturation calculating section 11 performs a process to extract the saturation from the image signal and the hue calculating section 31 performs a process to extract the hue value from the image signal.

In the present embodiment, the first correspondence value is the saturation before the adjustment and the second correspondence value is the saturation after the adjustment, but the color adjustment apparatus 1 is not limited to using these saturation values directly, and may instead use another value corresponding to the saturation as the first correspondence value or the second correspondence value. For example, the color adjustment apparatus 1 may use the saturation correspondence values described further below in the second embodiment as the first correspondence value and the second correspondence value, calculate the saturation correspondence value corresponding to the saturation after the adjustment according to the saturation correspondence value corresponding to the saturation before the adjustment, and calculate the image signal according to the saturation correspondence value.

Second Embodiment

Figure 7:
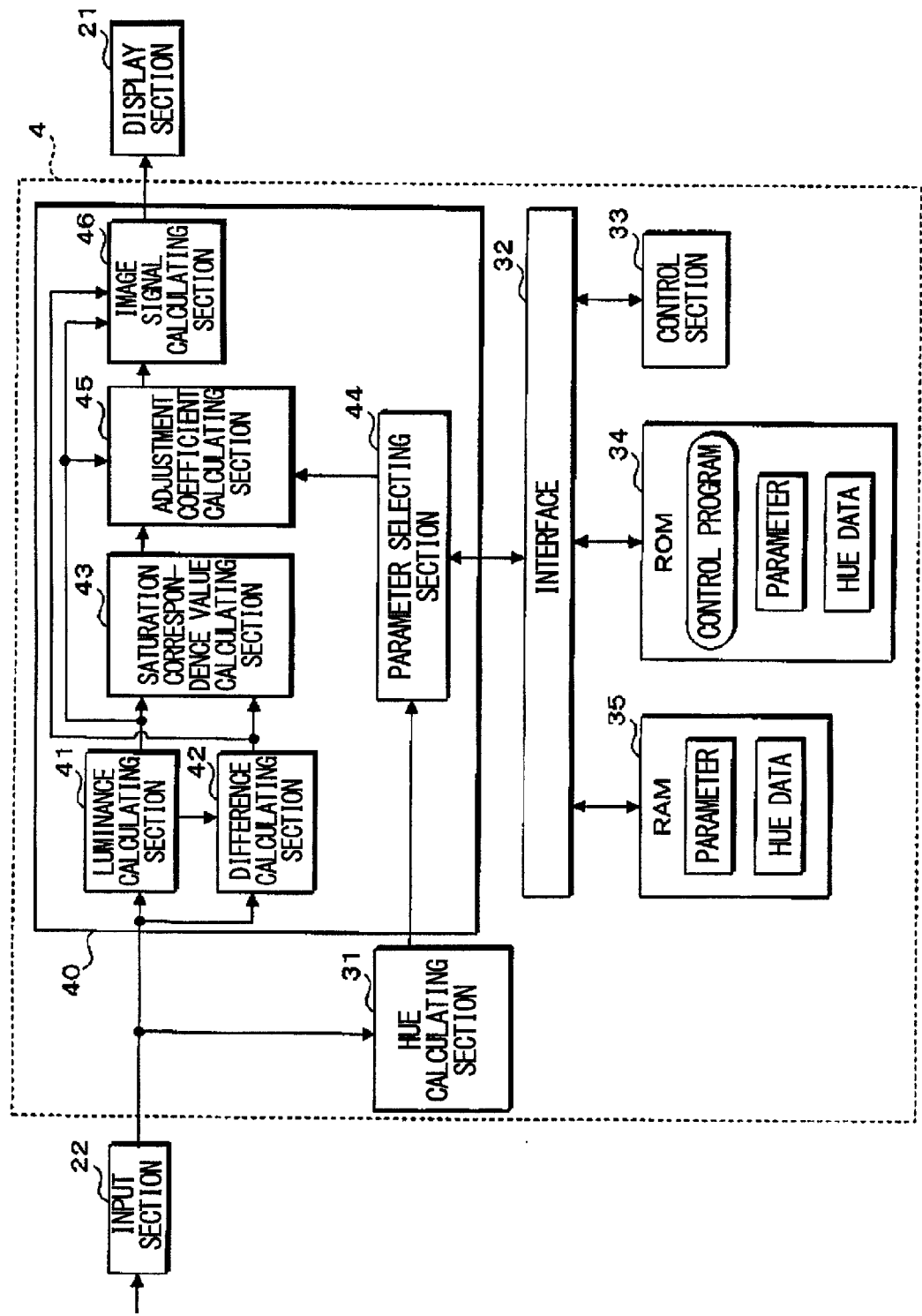
FIG. 7 is a block diagram showing a functional configuration inside an image display apparatus according to the second embodiment.

FIG. 7 is a block diagram showing a functional configuration inside an image display apparatus according to the second embodiment. The image display apparatus includes a color adjustment circuit 40. The color adjustment circuit 40, the hue calculating section 31, the interface 32, the control section 33, the ROM 34, and the RAM 35 form a color adjustment apparatus 4 according to the present embodiment. Other components of the image display apparatus are the same as those of the first embodiment and corresponding portions are given the same reference numerals, and redundant descriptions are omitted.

The color adjustment circuit 40 includes a luminance calculating section 41 that calculates the luminance of each pixel included in the image from the image signal and a difference calculating section 42 that calculates a difference between the luminance and each RGB value included in the image signal. The luminance calculating section 41 and the difference calculating section 42 are connected to the input section 22 and receive the image signal from the input section 22. The luminance calculating section 41 calculates the luminance using a prescribed calculation method, from the RGB values included in the image signal. For example, the luminance calculating section 41 calculates the luminance Y using Expression 1 shown below.

$Y=0.299R+0.587G+0.114B$      Expression 1:

The difference calculating section 42 is connected to the luminance calculating section 41, receives the luminance, and calculates the difference between the luminance and each of the RGB color signal values included in the image signal. The luminance calculating section 41 and the difference calculating section 42 are connected to a saturation correspondence value calculating section 43 that calculates the saturation correspondence value corresponding to the saturation. The luminance calculating section 41 inputs the calculated luminance to the saturation correspondence value calculating section 43, and the difference calculating section 42 inputs the calculated difference value to the saturation correspondence value calculating section 43. The saturation correspondence value calculating section 43 calculates the saturation correspondence value using the calculation method described below, from the received luminance and difference.

The color adjustment circuit 40 includes a parameter selecting section 44, and the parameter selecting section 44 is connected to the hue calculating section 31. The luminance calculating section 41, the saturation correspondence value calculating section 43, and the parameter selecting section 44 are connected to an adjustment coefficient calculating section 45 that calculates an adjustment coefficient, described further below, that is necessary for calculating the image signal whose color has been adjusted to increase the saturation. The adjustment coefficient calculating section 45 calculates the adjustment coefficient in a manner to increase the saturation, by using the parameter selected by the parameter selecting section 44. The luminance calculating section 41, the difference calculating section 42, and the adjustment coefficient calculating section 45 are connected to an image signal calculating section 46 that calculates the image signal using the adjustment coefficient calculated by the adjustment coefficient calculating section 45. The image represented by the image signal calculated by the image signal calculating section 46 is an image in which the saturation has been adjusted. The image signal calculating section 46 is connected to the display section 21 and inputs the calculated image signal into the display section 21.

The following describes the parameters used in the present embodiment. In the present embodiment, in the same manner as in the first embodiment, N hue ranges are defined in advance and hue data indicating each hue region is stored in the ROM 34. In the present embodiment, the image signal including the RGB color signal values representing the color after the adjustment is calculated directly from the image signal, without the intermediate process of calculating the saturation from the image signal including the RGB color signal values. In the present embodiment, the RGB color values before the adjustment are represented by Ri, Gi, and Bi, the RGB color signal values after the adjustment are represented by Ro, Go, and Bo, and the RGB color values representing the color resulting from the increased saturation are calculated using Expressions 2 to 4 shown below.

$$Ro = A(Ri-Y) + Y \qquad \text{Expression 2:}$$

$$Go = A(Gi-Y) + Y \qquad \text{Expression 3:}$$

$$Bo = A(Bi-Y) + Y \qquad \text{Expression 4:}$$

In Expressions 2 to 4, A is the adjustment coefficient for performing the color adjustment. When the adjustment coefficient A is 1, the RGB values do not change and therefore the color saturation does not change. When the adjustment coefficient A is greater than 1, the RGB values change and the saturation of the color represented by the RGB color signal increases. On the other hand, Y does not change even if Ro, Go, and Bo from Expressions 2 to 4 are substituted for RGB in Expression 1. This phenomenon is not limited to Expression 1, and the luminance Y does not change even when other methods are used to obtain the luminance from the RGB values. In other words, when the RGB color signal values are changed using Expressions 2 to 4, the luminance Y does not change. In the same manner, when the RGB color signal values are changed using Expression 2 to 4, the hue does not change. Accordingly, by adjusting the adjustment coefficient A and calculating the RGB color signal values using Expressions 2 to 4, it is possible to adjust the saturation without changing the luminance or the hue of the color of the image. However, if the adjustment coefficient A is changed without limitation, there is a possibility that the resulting color will be outside the range of color that can be displayed by the image display apparatus, and therefore it is necessary to limit the range over which the adjustment coefficient A is adjusted.

Here, Amax represents the maximum value that can be realized for the adjustment coefficient A within a range of color that can be displayed by the image display apparatus when Ri, Gi, and Bi are obtained. Furthermore, M represents the maximum value that can be realized for each of R, G, B, and Y. In a case where each of R, G, and B is expressed in binary and has a bit width of m, $M = 2^m - 1$. The range of values that can be realized for Ro, Go, and Bo is expressed below in Expressions 5 to 7.

$$0 \leq A(Ri-Y) + Y \leq M \qquad \text{Expression 5:}$$

$$0 \leq A(Gi-Y) + Y \leq M \qquad \text{Expression 6:}$$

$$0 \leq A(Bi-Y) + Y \leq M \qquad \text{Expression 7:}$$

One of Ri, Gi, and Bi is represented by Xi and the maximum value A that can be realized by Xi is represented by A(Xi). In a case where Xi−Y>0, A(Xi) can be expressed as shown by Expression 8 below, based on Expression 5.

$$A(Xi) = (M-Y)/(Xi-Y) \qquad \text{Expression 8:}$$

In a case where Xi−Y<0, A(Xi) can be expressed as shown by Expression 9 below, based on Expression 5.

$$A(Xi) = Y/(Y-Xi) \qquad \text{Expression 9:}$$

In a case where Xi−Y=0, A(Xi)=M. Here, A(Xi) is calculated for each of Ri, Gi, and Bi to obtain A(Ri), A(Gi), and A(Bi). The minimum value among A(Ri), A(Gi), and A(Bi) is Amax.

Figure 8:
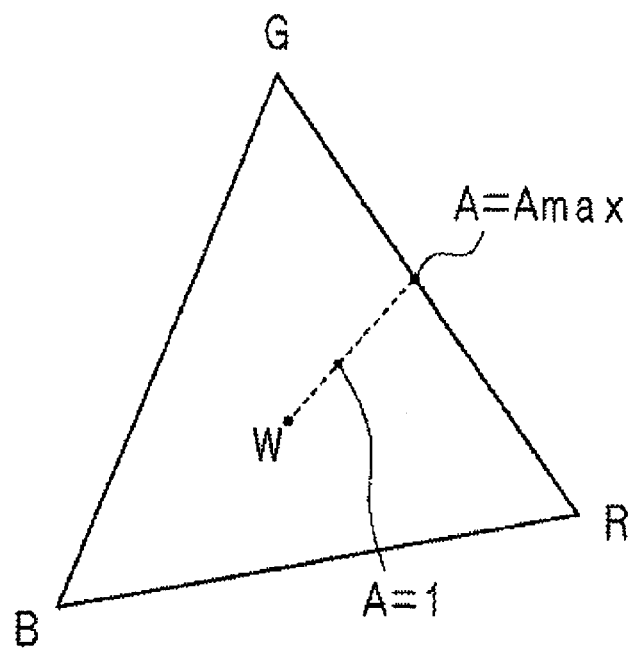
FIG. 8 is a view describing the relationship between Amax and the saturation in a chromaticity diagram.

FIG. 8 is a view describing the relationship between Amax and the saturation in a chromaticity diagram. The position of the white color is indicated by W. The position of the color before the adjustment is at a certain distance from the position of the white color. At this position, the adjustment coefficient A is 1. The position of the color whose saturation is increased to the maximum in the range of color that can be displayed by the image display apparatus is distanced farther from the position of the white color, and A=Amax at this position. In the present embodiment, the saturation correspondence value C corresponding to the saturation of an arbitrary color is defined as the value obtained by dividing a distance between the point of an arbitrary color and the point resulting from the saturation being increased to the maximum without changing the hue by a distance between the point of the arbitrary color and the point of the white color, in a color space using the RGB values as coordinate values. The distance between the point (Ro, Go, Bo) and the point (Ri, Gi, Bi) is (A−1) times the distance between the point (Ri, Gi, Bi) and the point (Y, Y, Y) of the white color. Therefore, the distance between the point of the arbitrary color and the point resulting from the saturation being increased to the maximum without changing the hue is (Amax−1) times the distance between the point of the arbitrary color and the point of the white color. Accordingly, the saturation correspondence value C of an arbitrary color is expressed by Expression 10 shown below.

$$C = A\text{max} - 1 \qquad \text{Expression 10:}$$

At the point of the white color, C=1, and at the point resulting from the saturation being increased to the maximum, C=0. In other words, the saturation correspondence value C increases as the saturation decreases, and the saturation correspondence value C decreases as the saturation increases. The saturation correspondence value C is a value that approximates an inverse function of the saturation.

Figure 9:
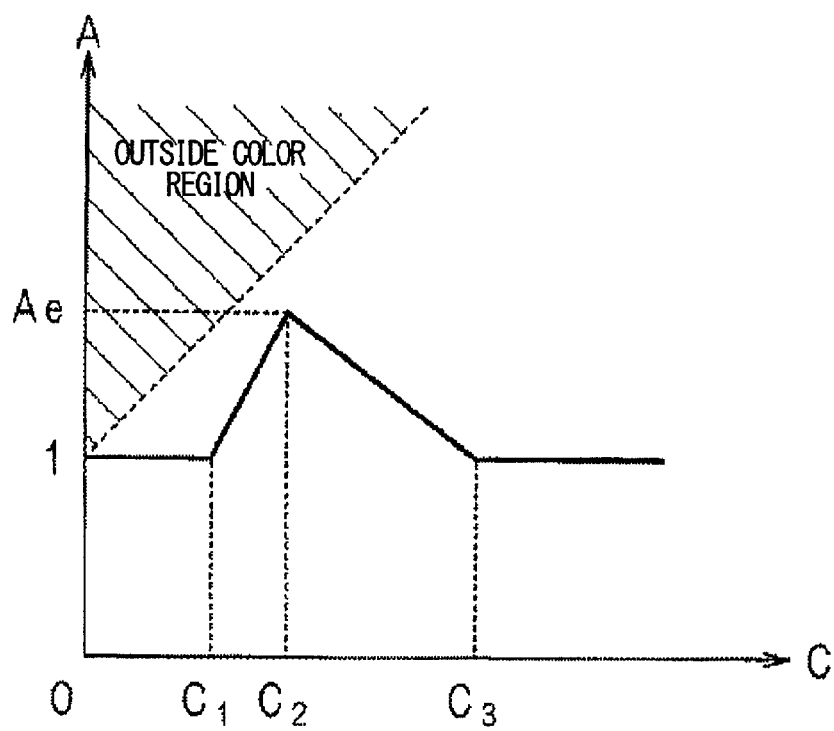
FIG. 9 is a characteristic diagram showing the relationship between the saturation correspondence value C and the adjustment coefficient.

The parameter to be used for the color adjustment is determined in advance for each of the N hue ranges. The parameter includes a lower limit value C1 for the saturation correspondence value C corresponding to the saturation that is to be increased, a saturation correspondence value C2 corresponding to the saturation for which the increase ratio is a maximum, and a lower limit value C3 for the saturation correspondence value C corresponding to the saturation that is to be increased. In the present embodiment, the color saturation of the image is increased by the adjustment coefficient calculating section 45 determining the adjustment coefficient A according to the saturation correspondence value C. FIG. 9 is a characteristic diagram showing the relationship between the saturation correspondence value C and the adjustment coefficient A. In the drawing, the horizontal axis indicates the saturation correspondence value C and the vertical axis indicates the adjustment coefficient A. The magnitude relationship of the saturation correspondence value C is such that C1<C2<C3. The value of the adjustment coefficient A corresponding to the saturation correspondence value C2 is Ae. The dashed line in the drawing indicates Expression 11 shown below, which is a rearrangement of Expression 10.

$$A\text{max} = C + 1 \qquad \text{Expression 11:}$$

The line of Expression 11 indicates Amax, i.e. the A value for obtaining the maximum saturation that can be displayed by the image display apparatus, and when the adjustment coefficient increases beyond this line, A is greater than Amax and the represented color cannot be displayed by the image display apparatus. As shown in FIG. 9, the adjustment coefficient calculating section 45 keeps the adjustment coefficient A at a value of 1 for saturation correspondence values C that are less than or equal to C1, and also sets the adjustment coefficient A to a value of 1 for saturation correspondence values C that are greater than or equal to C3. For saturation correspondence values C that are greater than C1 and less than C3, the adjustment coefficient calculating section 45 performs a process to increase the adjustment coefficient A to be greater than 1, in order to increase the saturation. The adjustment coefficient calculating section 45 performs a process to set the adjustment coefficient A to be Ae according to the saturation correspondence value C2. Furthermore, the adjustment coefficient calculating section 45 calculates the adjustment coefficient A corresponding to the range from C1 to C2 to increase monotonically relative to the increase of the saturation correspondence value C. Furthermore, the adjustment coefficient calculating section 45 calculates the adjustment coefficient A in the range from C2 to C3 to decrease monotonically relative to the increase of the saturation correspondence value C. Referencing FIG. 9, the adjustment coefficient A corresponding to the range from C1 to C2 is calculated to follow the straight line formed by connecting (C1, 1) and (C2, Ae), and the adjustment coefficient A corresponding to the range from C2 to C3 is determined to follow the straight line formed by connecting (C2, Ae) and (C3, 1). As shown in FIG. 9, if C1, C2, C3, and Ae are determined, the correspondence relationship between the saturation correspondence value C and the adjustment coefficient A is determined, and the adjustment coefficient A corresponding to an arbitrary saturation correspondence value C is obtained based on this correspondence relationship.

Figure 10:
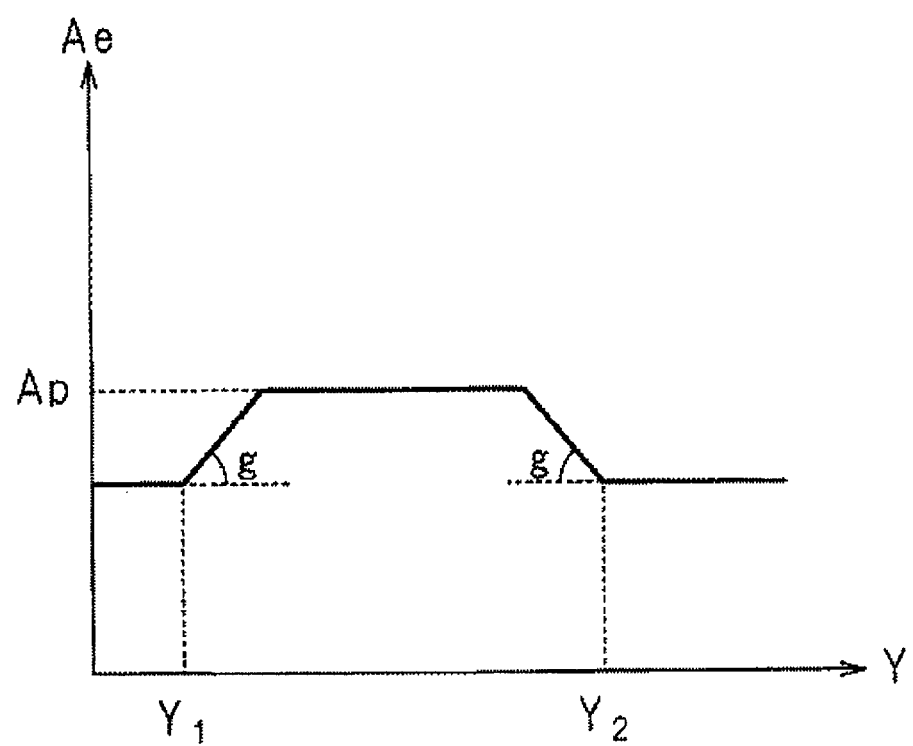
FIG. 10 is a characteristic diagram showing the relationship between the luminance and the adjustment coefficient Ae.

In the present embodiment, the adjustment coefficient Ae corresponding to the saturation correspondence value C2 is determined according to the luminance Y. FIG. 10 is a characteristic diagram showing the relationship between the luminance and the adjustment coefficient Ae. In the drawing, the horizontal axis indicates the luminance Y and the vertical axis indicates the adjustment coefficient Ae corresponding to the saturation correspondence value C2. Furthermore, Y1 is a lower limit value of the luminance when the adjustment coefficient Ae is determined to be greater than or equal to 1, Y2 is an upper limit value of the luminance when the adjustment coefficient Ae is determined to be greater than or equal to 1, and Ap is the maximum value of the adjustment coefficient Ae. Furthermore, g is the gradient of the straight line representing the change of the adjustment coefficient Ae relative to the luminance Y until the adjustment coefficient Ae corresponding to a luminance Y that is greater than or equal to Y1 reaches Ap. Yet further, −g is the gradient of the straight line representing the change of the adjustment coefficient Ae corresponding to the luminance until the adjustment coefficient Ae decreases from Ap and reaches a value of 1 at the luminance Y2. The gradient g is set in order to avoid sudden changes of the saturation in response to change in the luminance Y. The value of Ap is determined to be a value smaller than the adjustment coefficient Amax on the line of Expression 11 shown in FIG. 9. As shown in FIG. 10 the adjustment coefficient Ae corresponding to the saturation correspondence value C2 is determined according to the luminance Y. The parameters include Y1, Y2, Ap, and g. The parameters are determined for each of the N hue ranges, and stored in advance in the ROM 34. For example, hue ranges of number 0 to number N−1 are stored in association with C1, C2, C3, Y1, Y2, Ap, and g.

Figure 11:
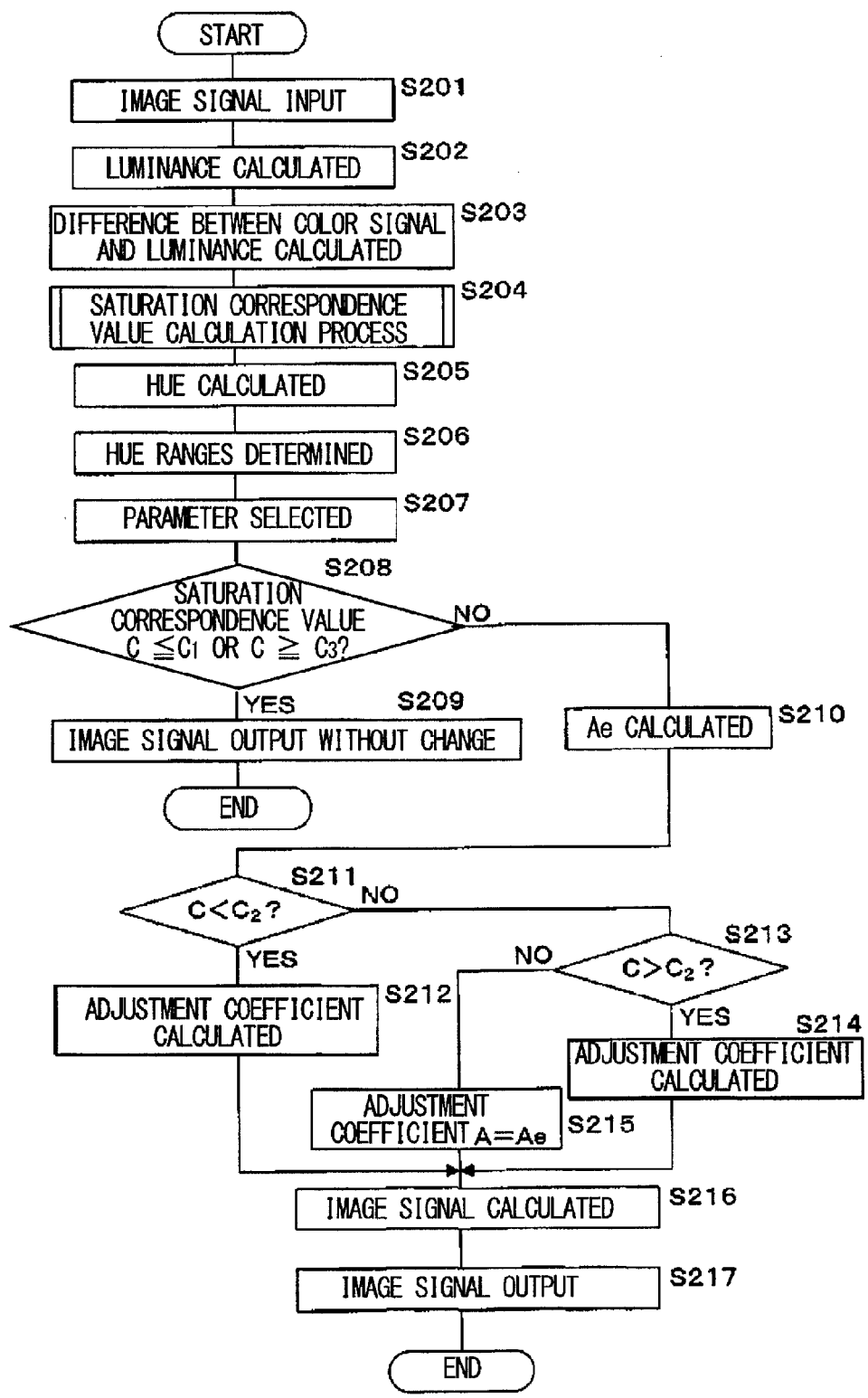
FIG. 11 is a flow chart showing the steps of the processes executed by the color adjustment apparatus according to the second embodiment.

The following describes the color adjustment method. At a prescribed timing, such as when the image processing apparatus is activated, the control section 33 reads the parameters and the hue data from the ROM 34, and stores this information in the RAM 35. FIG. 11 is a flow chart showing the steps of the processes executed by the color adjustment apparatus 4 according to the second embodiment. The image signal corresponding to one pixel is input from the input section 22 to the color adjustment circuit 40 and the hue calculating section 31 (S201), and the luminance calculating section 41 calculates the luminance Y using a prescribed method, such as the method used in Expression 1 (S202). The difference calculating section 42 receives the luminance Y from the luminance calculating section 41 and calculates the difference between the luminance Y and each of the color signals Ri, Gi, and Bi included in the image signal (S203). The luminance calculating section 41 inputs the luminance Y into the saturation correspondence value calculating section 43, the adjustment coefficient calculating section 45, and the image signal calculating section 46, and the difference calculating section 42 inputs the calculated difference to the saturation correspondence value calculating section 43 and the image signal calculating section 46. The saturation correspondence value calculating section 43 executes a saturation correspondence value calculation process to calculate the saturation correspondence value C corresponding to the color saturation of the pixel represented by the image signal, based on the luminance Y and the difference from the difference calculating section 42 (S204).

Figure 12:
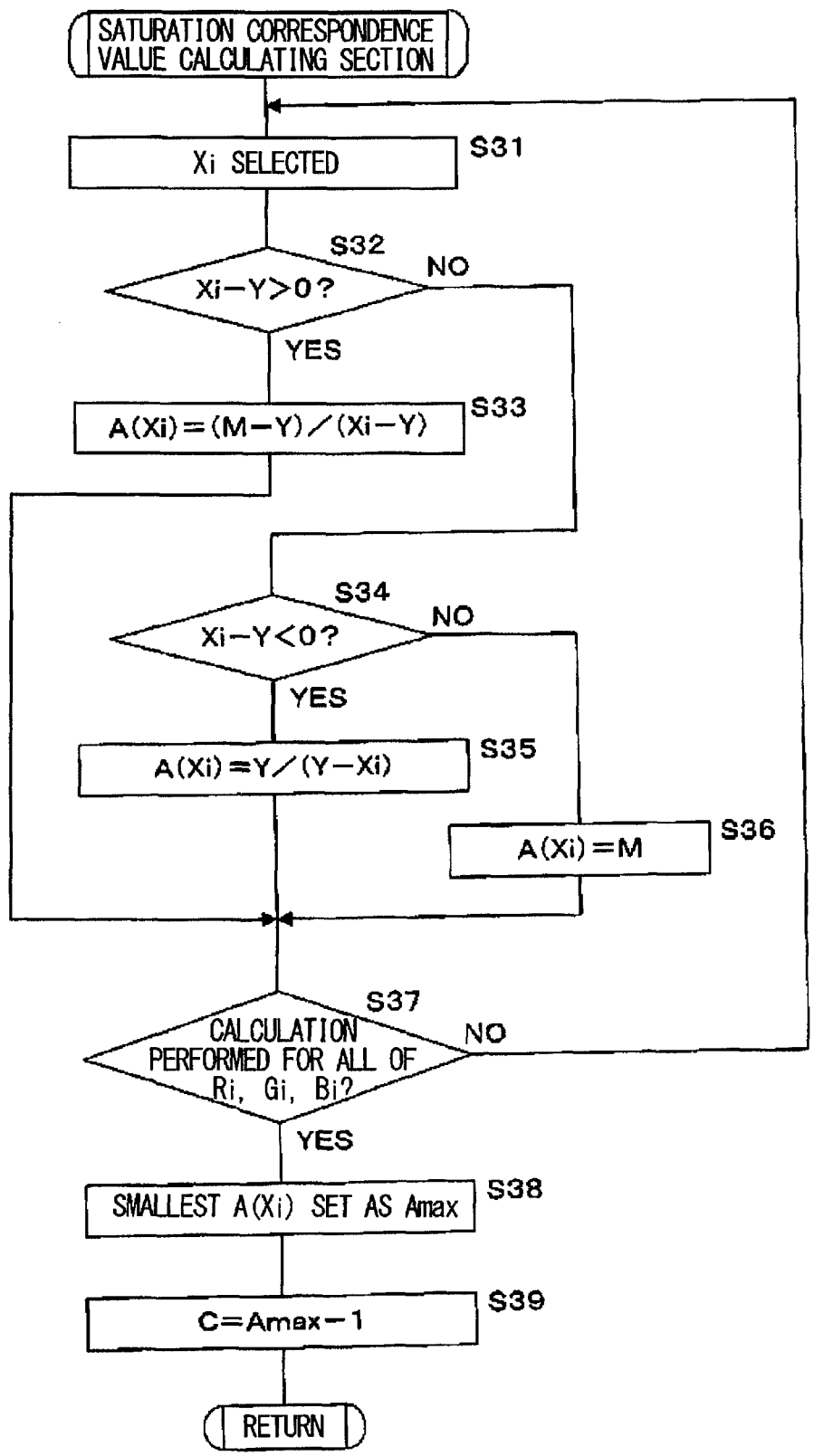
FIG. 12 is a flow chart showing the steps of the subroutine process of the saturation correspondence value calculation process.

FIG. 12 is a flow chart showing the steps of the sub-routine process of the saturation correspondence value calculation process. The saturation correspondence value calculating section 43 selects one Xi from among Ri, Gi, and Bi (S31), and determines whether the difference (Xi−Y) input from the difference calculating section 42 is greater than zero (S32). If the difference (Xi−Y) is greater than zero (S32: YES), the saturation correspondence value calculating section 43 calculates A(Xi) according to Expression 8 (S33). If the difference (Xi−Y) is less than or equal to zero (S32: NO), the saturation correspondence value calculating section 43 determines whether the difference (Xi−Y) is less than zero (S34). If the difference (Xi−Y) is less than zero (S34: YES), the saturation correspondence value calculating section 43 calculates A(Xi) according to Expression 9 (S35). If the difference (Xi−Y) is zero (S34: NO), the saturation correspondence value calculating section 43 determines that A(Xi)=M (S36). When step S33, S35, or S36 has been completed, the saturation correspondence value calculating section 43 determines whether A(Xi) has been calculated for all of Ri, Gi, and Bi (S37). If A(Xi) has not yet been calculated for all of Ri, Gi, and Bi (S37: NO), the saturation correspondence value calculating section 43 returns the process to step S31 and selects an Xi for which A(Xi) has not yet been calculated. If all of the A(Xi) values have been calculated (S37: YES), the saturation correspondence value calculating section 43 determines Amax to be the minimum A(Xi) value from among A(Ri), A(Bi), and A(Gi) (S38). Next, the saturation correspondence value calculating section 43 calculates the saturation correspondence value C according to Expression 10 (S39), and inputs the calculated saturation correspondence value C and the luminance Y into the adjustment coefficient calculating section 45. At this point, the saturation correspondence value calculating section 43 ends the sub-routine process of the saturation correspondence value calculation process.

The hue calculating section 31 calculates the hue from the image signal (S205). The parameter selecting section 44 receives the hue from the hue calculating section 31 and determines the hue range that includes this hue value (S206). The parameter selecting section 44 then selects the parameter to be used for calculating the adjustment coefficient, according to the determined hue range (S207). At step S207, the parameter selecting section 44 reads from the RAM 35 the parameter associated with the determined hue range from among the parameters stored in the RAM 35 in association with the N hue ranges. For example, the parameter selecting section 44 reads C1, C2, C3, Y1, Y2, Ap, and g associated with the number of the determined hue range from the RAM 35. The parameter selecting section 44 inputs the parameter to the adjustment coefficient calculating section 45. The processes from S205 to S207 may be executed before the processes of steps S201 to S204, or may be executed in parallel with the processes of step S201 to S204.

The adjustment coefficient calculating section 45 references the parameter read by the parameter selecting section 44 and determines whether the saturation correspondence value C calculated by the saturation correspondence value calculating section 43 is less than or equal to C1 included in the parameter and whether this saturation correspondence value C is greater than or equal to C3 (step S208). If the saturation correspondence value C is less than or equal to C1 or greater than or equal to C3 (S208: YES), the adjustment coefficient calculating section 45 inputs a signal indicating that the saturation is not to be increased into the image signal calculating section 46, and the image signal calculating section 46 outputs the image signal that was input to the color adjustment circuit 40 from the input section 22 to the display section 21 without change (S209).

If the saturation correspondence value C is greater than C1 and less than C3 (S208: NO), the adjustment coefficient calculating section 45 calculates the adjustment coefficient Ae for a case where C=C2 (S210). Specifically, according to Y1, Y2, Ap, and g included in the parameter, the adjustment coefficient calculating section 45 generates the relationship between the luminance Y and Ae as shown in FIG. 10, and determines the Ae corresponding to the luminance Y based on the generated relationship. Next, the adjustment coefficient calculating section 45 determines whether the saturation correspondence value C is less than C2 included in the parameter (S211). If the saturation correspondence value C is less than C2 (S211: YES), the adjustment coefficient calculating section 45 calculates the adjustment coefficient A based on C1 and C2 included in the parameter and the calculated Ae. Specifically, the saturation adjusting section 13 calculates the adjustment coefficient A corresponding to the saturation correspondence value C according to a correspondence relationship between the adjustment coefficient A and the saturation correspondence value C whereby the adjustment coefficient A that is greater than or equal to 1 increases according to an increase in the saturation correspondence value C until A=Ae when C=C2, such as shown in FIG. 9 (S212). At step S211, of the saturation correspondence value C is greater than or equal to C2 (S211: NO), the adjustment coefficient calculating section 45 determines whether the saturation correspondence value C is greater than C2 (S213). If the saturation correspondence value C is greater than C2 (S213: YES), the adjustment coefficient calculating section 45 calculates the adjustment coefficient A based on C2, C3, and Ae (S214). Specifically, the saturation adjusting section 13 calculates the adjustment coefficient A corresponding to the saturation correspondence value C according to a correspondence relationship between the saturation correspondence value C and the adjustment coefficient A whereby A=Ae when C=C2 and the adjustment coefficient A that is greater than or equal to 1 decreases according to the increase of the saturation correspondence value C, such as shown in FIG. 9. At step S213, if C=C2 (S213: NO), the adjustment coefficient calculating section 45 determines the adjustment coefficient A to be Ae (S215).

After step S212, S214, or S215 has been completed, the adjustment coefficient calculating section 45 inputs the calculated adjustment coefficient A into the image signal calculating section 46. The image signal calculating section 46 calculates the image signal by calculating the RGB values according to Expressions 2 to 4, using the difference calculated by the difference calculating section 42, the adjustment coefficient A, and the luminance Y (S216). As a result of this calculation, the image signal is obtained that represents the color adjusted in a manner to increase the saturation without changing the luminance or the hue. The image signal calculating section 46 outputs the calculated image signal to the display section 21 (S217). The color adjustment apparatus 4 executes the processes of steps S201 to S217 for all of the pixels in the image represented by the image signal input to the input section 22. The display section 21 displays the image whose color has been adjusted to increase the saturation, by displaying the image based on the image signal from the color adjustment circuit 40. In a case where the image is a moving image, the color adjustment apparatus 4 executes the processing for each frame or each field, and the display section 21 displays the image in which the color has been adjusted.

The color adjustment apparatus 4 may be configured to perform a process to calculate the image signal even when the saturation correspondence value C is less than or equal to C1 or greater than or equal to C3. With this configuration, instead of step S208, the adjustment coefficient calculating section 45 performs a process to determine a value of 1 for the adjustment coefficient A, and then the processing moves to step S216.

As described in detail above, with the present embodiment as well, the color adjustment apparatus 4 determines in advance the parameters that define the saturation values to be increased and the amount of the increase for each of a plurality of hue ranges, and increases the saturation of the color included in the image according to the hue and the correspondence relationship between the saturation correspondence value C and the adjustment coefficient A. In the present embodiment as well, the plurality of hue ranges and the parameter for each hue range are suitably determined through experience, such that the colors representative of the plurality of objects that must be distinguished from each other among the objects shown in the image are each in a different hue range and such that the increases in saturation between the hue ranges are different, thereby making it easier to distinguish between objects shown in the image displayed by the image display apparatus when compared to the conventional technology. For example, it becomes easier to distinguish between an internal organ and a blood vessel in a color medical image when compared to the conventional technology. Furthermore, in the same manner as in the first embodiment, in the present embodiment, even when the hues of the colors of a plurality of objects that must be distinguished from each other are included in the same hue range, it is possible to more easily distinguish between the objects shown in the image displayed by the image display apparatus when compared to the conventional technology.

In the present embodiment, the color adjustment apparatus 4 calculates the image signal in which the saturation has been increased using Expressions 2 to 4, and therefore it is possible to increase the color saturation of the image without performing a color space conversion. It is possible to simplify the process for increasing the saturation and to simplify the configuration of the color adjustment apparatus 4. Furthermore, the color adjustment apparatus 4 can increase the saturation while maintaining the luminance and hue of the color of the image, and can increase the saturation to be within a range that does not exceed the maximum saturation that can be displayed by the image display apparatus. Therefore, color shift and reduced luminance do not occur in the image, and so it does not become more difficult to distinguish detailed portions since the image quality is not reduced.

In the same manner as in the first embodiment, in the present embodiment, even when the hues of the colors of a plurality of objects that must be distinguished from each other are included in the same hue range, it is possible to more easily distinguish between the objects shown in the image displayed by the image display apparatus when compared to the conventional technology. The color adjustment apparatus 4 may be configured to receive an image signal other than an image signal including the RGB color signal values, such as an image signal in which the pixel color is represented by a luminance signal and a color difference signal.

In the same manner as in the first embodiment, the color adjustment apparatus 4 of the present embodiment may be configured to not classify the hue into a plurality of hue ranges. With this configuration, the color adjustment apparatus 4 does not include the hue calculating section 31, while the ROM 34 and the RAM 35 do not store hue data but instead store one type of parameter. Furthermore, with this configuration, the color adjustment apparatus 4 does not execute the processes of steps S205 and S206, and executes a process to read the one type of parameter at step S207. With this configuration as well, it is possible to increase the saturation such that the difference between colors of a plurality of objects shown in the image becomes greater, thereby making it easier to distinguish between a plurality of objects shown in an image when compared to the conventional technology.

As shown in FIG. 10, the gradient of the straight line representing the change in the adjustment coefficient Ae relative to the luminance Y from when the adjustment coefficient Ae decreases from Ap until reaching a value of 1 at the luminance Y2 may be a value other than −g. With this configuration, the parameter includes a value of the gradient by which the adjustment coefficient Ae decreases from Ap, in addition to C1, C2, C3, Y1, Y2, Ap, and g. The color adjustment apparatus 4 performs the calculation at step S210 using this gradient value.

In the present embodiment, the adjustment coefficient A is calculated according to the luminance Y, but the color adjustment apparatus 4 is may instead be configured to not perform the adjustment with the adjustment coefficient A corresponding to the luminance Y. With this configuration, the parameter does not include Y1, Y2, Ap, or g, and instead includes a constant as the adjustment characteristic Ae corresponding to the saturation correspondence value C2. The adjustment coefficient calculating section 45 calculates the adjustment coefficient A using the Ae included in the parameter. The color adjustment apparatus 4 may be configured to be able to set whether the calculation of the adjustment coefficient A corresponding to the luminance Y is performed. With this configuration, the color adjustment apparatus 4 stores in the ROM 34 information indicating whether to perform the calculation of the adjustment coefficient A corresponding to the luminance Y, and determines whether to perform the calculation of the adjustment coefficient A corresponding to the luminance Y according to the stored information.

The color adjustment apparatus 4 may be configured to receive an image signal that includes color signals other than RGB color signals. With this configuration, the color adjustment apparatus 4 performs the process to calculate the image signal after the color adjustment from the image signal before the adjustment, according to expressions similar to Expression 2 to 4. The color adjustment apparatus 4 may be configured to receive an image signal that includes a luminance signal. With this configuration, the luminance calculating section 41 performs a process to extract the luminance signal from the image signal. The image display apparatus may be configured to generate an image signal including a color signal from an image signal that does not include a color signal, and input the generated image signal to the color adjustment apparatus 4 from the input section 22.

In the first and second embodiments described above, the necessary parameters are read from the RAM 35, but the color adjustment apparatus according to the present embodiment may be configured to read the parameters directly from the ROM 34. Furthermore, in the first and second embodiments, the parameters necessary for the processing are determined in advance, but the color adjustment apparatus may be configured to be able to change the parameters. For example, the color adjustment apparatus may be configured to include a manipulating section that receives a manipulation of a user and to perform a process to change the values of the parameters stored in the RAM 35 according to the manipulation from the user received by the manipulating section. In the first and second embodiments, the functions necessary for the color adjustment apparatus are realized by hardware, but the color adjustment apparatus according to the present invention may be configured to execute some or all of the processes of the color adjustment method according to the present invention using software or firmware. In the first and second embodiments, the color adjustment apparatus is included in the image display apparatus, but the color adjustment apparatus according to the present invention may be included in an apparatus other than an image display apparatus. For example, the color adjustment apparatus may be included in a color printer. In this case, the color adjustment apparatus outputs the image signal representing the image whose saturation has been increased, and the color printer executes a process to record the color image based on the image signal onto recording paper.

LIST OF REFERENCE NUMERALS

1, 4: color adjustment apparatus
10, 40: color adjustment circuit
11: saturation calculating section
12: maximum saturation calculating section
13: saturation adjusting section
14, 44: parameter selecting section
15, 46: image signal calculating section
21: display section
31: hue calculating section
34: ROM
35: RAM
41: luminance calculating section
42: difference calculating section
43: saturation correspondence value calculating section
45: adjustment coefficient calculating section

What is claimed is:
1. A color adjustment apparatus that adjusts color of a color image represented by an image signal, comprising:
a storage section that stores parameters including a lower limit value S1 and an upper limit value S3 for saturation to be adjusted within a saturation before color adjustment, a maximum setting value S2 between S1 to S3 determining a saturation whose change amount is to be greatest within the saturation before color adjustment, and a saturation Se after color adjustment in a case where the saturation before color adjustment is equal to S2;

a saturation correspondence value calculating section that calculates the saturation S_in before color adjustment of each pixel forming the color image, from the image signal;

a saturation adjusting section that calculates the saturation S_out after color adjustment corresponding to the saturation S_in before color adjustment calculated by the saturation correspondence value calculating section, based on the parameters; and an image generating section that generates a color image with an image signal representing the color image in which the color has been adjusted, according to the saturation S_out after color adjustment calculated by the saturation adjusting section, wherein the saturation adjusting section (i) increases S_in in the range from S1 to S2 such that the saturation increase amount increases according to the increase of S_in and increases S_in in the range from S2 to S3 such that the saturation increase amount decreases according to the increase of S_in, or (ii) decreases S_in in the range from S1 to S2 such that the saturation decrease amount increases according to the increase of S_in and decreases S_in in the range from S2 to S3 such that the saturation decrease amount decreases according to the increase of S_in, and when the saturation is less than or equal to S1, S_out is equal to S_in.

2. The color adjustment apparatus according to claim 1, further comprising:

a section for calculating a maximum value that can be realized by the saturation of each pixel, based on the image signal, wherein the saturation adjusting section calculates the saturation S_out such that the saturation after color adjustment is less than or equal to the maximum value.

3. The color adjustment apparatus according to claim 1, wherein the storage section stores the parameters in association with each of a plurality of hue ranges obtained by classifying hue, the color adjustment apparatus further comprises:

a hue acquiring section that acquires the hue of each pixel forming the color image, from the image signal; and a parameter reading section that reads the parameters associated with the hue acquired by the hue acquiring section from among parameters stored in the storage section, and the saturation adjusting section performs calculation based on the parameters read by the parameter reading section.

4. An image display apparatus comprising:

the color adjustment apparatus according to claim 1; and a section for displaying the color image whose color has been adjusted by the color adjustment apparatus.

5. The color adjustment apparatus according to any one of claim 1, wherein the saturation adjusting section controls the saturation such that the relationship between S_out and S_in in the range from S1 to S2 is a relationship following a straight line formed by connecting (S1, S1) and (S2, Se), and the relationship between S_out and S_in in the range from S2 to S3 is a relationship following a straight line formed by connecting (S2, Se) and (S3, S3).

6. A color adjustment apparatus that adjusts color in a manner to increase saturation of a color image represented by an image signal, comprising:

a storage section that stores parameters;

a section for acquiring a luminance value of each pixel from the image signal that includes RGB color signal values for expressing, in combination with a plurality of colors, the color of each pixel forming the color image;

a saturation correspondence value calculating section that calculates a saturation correspondence value corresponding to the saturation of each pixel, from the image signal;

a saturation adjusting section that calculates an adjustment coefficient corresponding to the saturation correspondence value calculated by the saturation correspondence value calculating section, based on the parameters; and an image generating section for generating a color image with an image signal expressing the color image in which the color has been adjusted by, for each of the RGB color signal values, multiplying a value obtained by subtracting the luminance value from the color signal value before color adjustment by the adjustment coefficient calculated by the saturation adjusting section and then adding the luminance value to the result of the multiplication to calculate the color signal value after color adjustment, wherein the parameters are determined to define a maximum value of the adjustment coefficient calculated by the saturation adjusting section to be a value that causes all of the RGB color signal values after color adjustment to be less than or equal to a maximum value that can be realized by each signal value, and the saturation adjusting section calculates the adjustment coefficient to be a value that causes all of the RGB color signal values after color adjustment to be less than or equal to a maximum value that can be realized by each signal value.

7. The color adjustment apparatus according to claim 6, wherein the saturation correspondence value is obtained, for each pixel, by dividing a distance between a point corresponding to the color of the pixel and a point corresponding to a color obtained by increasing the saturation to the maximum without changing a hue and a distance between the point corresponding to the pixel and a point corresponding to a white color, in a color space in which the RGB color signal values are coordinates, and the saturation correspondence value calculating section includes:

a section for calculating the adjustment coefficient for obtaining the RGB color signal values representing the colors obtained by increasing the saturation to the maximum without changing the hue of each pixel, using a calculation method that is the same as the calculation performed by the image generating section; and a section for calculating, as the saturation correspondence value, a value obtained by subtracting 1 from the adjustment coefficient calculated by the section for calculating the adjusting coefficient.

8. The color adjustment apparatus according to claim 7, wherein the parameters include a lower limit value and an upper limit value for the value calculated using the same calculation method as used for the saturation correspondence value according to the saturation to be increased within the saturation before color adjustment, a maximum setting value that determines a value obtained using the same calculation method as used for the saturation correspondence value according to the saturation to be increased to the maximum within the saturation before color adjustment, and the adjustment coefficient for a case in which the saturation correspondence value is equal to the maximum setting value, the adjustment coefficient being determined to be a value greater than 1 and less than or equal to a value obtained by adding 1 to the maximum setting value, and the saturation adjusting section further includes:
a section for calculating the adjustment coefficient in a manner to increase according to an increase of the saturation correspondence value, when the saturation correspondence value is greater than the lower limit value and less than the maximum setting value; and
a section for calculating the adjustment coefficient in a manner to decrease according to an increase of the saturation correspondence value, when the saturation correspondence value is greater than the maximum setting value and less than the upper limit value.

9. The color adjustment apparatus according to claim 7, wherein the parameters include a lower limit value and an upper limit value for the value calculated using the same calculation method as used for the saturation correspondence value according to the saturation to be increased within the saturation before color adjustment, a maximum setting value that determines a value obtained using the same calculation method as used for the saturation correspondence value according to the saturation to be increased to the maximum within the saturation before color adjustment, and a coefficient change parameter for changing the adjustment coefficient for a case in which the saturation correspondence value is equal to the maximum setting value, according to a brightness value in a range from a value greater than 1 to a value less than or equal to a value obtained by adding 1 to the maximum setting value, and the saturation adjusting section further includes:
a section for calculating the adjustment coefficient for the case in which the saturation correspondence value is equal to the maximum setting value according to the brightness value, based on the coefficient change parameter;
a section for calculating the adjustment coefficient in a manner to increase according to an increase of the saturation correspondence value, when the saturation correspondence value is greater than the lower limit value and less than the maximum setting value; and
a section for calculating the adjustment coefficient in a manner to decrease according to an increase of the saturation correspondence value, when the saturation correspondence value is greater than the maximum setting value and less than the upper limit value.

10. The color adjustment apparatus according to claim 6, wherein the storage section stores the parameters in association with each of a plurality of hue ranges obtained by classifying hue, the color adjustment apparatus further comprises:
a hue acquiring section that acquires the hue of each pixel forming the color image, from the image signal; and
a parameter reading section that reads the parameters associated with the hue acquired by the hue acquiring section from among parameters stored in the storage section, and the saturation adjusting section performs calculation based on the parameters read by the parameter reading section.

11. An image display apparatus comprising:
the color adjustment apparatus according to claim 6; and
a section for displaying the color image whose color has been adjusted by the color adjustment apparatus.

12. A color adjustment method for adjusting color of a color image represented by an image signal, comprising:

determining parameters including a lower limit value S1 and an upper limit value S3 for saturation to be adjusted within a saturation before color adjustment, a maximum setting value S2 between S1 to S3 determining a saturation whose change amount is to be greatest within the saturation before color adjustment, and a saturation Se after color adjustment in a case where the saturation before color adjustment is equal to S2;

saturation correspondence value calculation of calculating the saturation S_in before color adjustment of each pixel forming the color image, from the image signal;

saturation adjustment of calculating the saturation S_out after color adjustment corresponding to the saturation S_in before color adjustment calculated in the saturation correspondence value calculation, based on the parameters; and generating a color image with an image signal representing the color image in which the color has been adjusted, according to the saturation S_out after color adjustment calculated in the saturation adjustment, wherein the saturation adjustment (i) increases S_in in the range from S1 to S2 such that the saturation increase amount increases according to the increase of S_in and increases S_in in the range from S2 to S3 such that the saturation increase amount decreases according to the increase of S_in, or (ii) decreases S_in in the range from S1 to S2 such that the saturation decrease amount increases according to the increase of S_in and decreases S_in in the range from S2 to S3 such that the saturation decrease amount decreases according to the increase of S_in, and when the saturation is less than or equal to S1, S_out is equal to S_in.

13. The color adjustment method according to claim 12, wherein the parameters are determined in association with each of a plurality of hue ranges obtained by classifying hue, the color adjustment method further comprises:
acquiring the hue of each pixel forming the color image, from the image signal; and
reading the parameters associated with the acquired hue from among a plurality of the parameters, and the saturation adjustment includes performing calculation based on the read parameters.

14. The color adjustment method according to claim 12, wherein the saturation adjustment controls the saturation such that the relationship between S_out and S_in in the range from S1 to S2 is a relationship following a straight line formed by connecting (S1, S1) and (S2, Se), and the relationship between S_out and S_in in the range from S2 to S3 is a relationship following a straight line formed by connecting (S2, Se) and (S3, S3).

15. A color adjustment method for adjusting color in a manner to increase saturation of a color image represented by an image signal, comprising:

determining parameters;

acquiring a luminance value of each pixel from the image signal that includes a plurality of RGB color signal values for expressing, in combination with a plurality of colors, the color of each pixel forming the color image;

saturation correspondence value calculation of calculating a saturation correspondence value corresponding to the saturation of each pixel, from the image signal;

saturation adjustment of calculating an adjustment coefficient corresponding to the saturation correspondence value calculated in the saturation correspondence value calculation, based on the parameters; and image generation of generating a color image with an image signal expressing the color image in which the color has been adjusted, by, for each of the RGB color signal values, multiplying a value obtained by subtracting the luminance value from the color signal value before color adjustment by the adjustment coefficient calculated in the saturation adjustment and then adding the luminance value to the result of the multiplication to calculate the color signal value after color adjustment, wherein the parameters are determined to define a maximum value of the adjustment coefficient calculated in the saturation adjustment to be a value that causes all of the RGB color signal values after color adjustment to be less than or equal to a maximum value that can be realized by each signal value, and the saturation adjustment includes calculating the adjustment coefficient to be a value that causes all of the RGB color signal values after color adjustment to be less than or equal to a maximum value that can be realized by each signal value.

16. The color adjustment method according to claim 15, wherein the saturation correspondence value is obtained, for each pixel, by dividing a distance between a point corresponding to the color of the pixel and a point corresponding to a color obtained by increasing the saturation to the maximum without changing a hue and a distance between the point corresponding to the pixel and a point corresponding to a white color, in a color space in which the RGB color signal values are coordinates, and the saturation correspondence value calculation includes:

calculating the adjustment coefficient for obtaining the RGB color signal values representing the colors obtained by increasing the saturation to the maximum without changing the hue of each pixel, using a calculation method that is the same as the calculation performed in the image signal generation; and calculating, as the saturation correspondence value, a value obtained by subtracting 1 from the calculated adjustment coefficient.

17. The color adjustment method according to claim 15, wherein the parameters are determined in association with each of a plurality of hue ranges obtained by classifying hue, the color adjustment method further comprises:

acquiring the hue of each pixel forming the color image, from the image signal; and reading the parameters associated with the acquired hue from among a plurality of the parameters, and the saturation adjustment includes performing calculation based on the read parameters.

* * * * *